United States Patent
Thillen

(10) Patent No.: US 9,488,367 B2
(45) Date of Patent: Nov. 8, 2016

(54) EXTERNAL COMBUSTION STEAM ENGINE ELECTRICAL GENERATOR HAVING A FUEL SYSTEM, AN ENGINE SYSTEM, AND AN ELECTRICAL SYSTEM ATTACHED AND CONFIGURED IN A STACKED OR SIDE-BY-SIDE RELATION WITH A SMALL TOTAL FOOTPRINT AREA

(75) Inventor: Thomas V. Thillen, Cordova, TN (US)

(73) Assignee: Phoenix Power Group, LLC, Cordova, TN (US)

( * ) Notice: Subject to any disclaimer, the term of this patent is extended or adjusted under 35 U.S.C. 154(b) by 147 days.

(21) Appl. No.: 13/531,207

(22) Filed: Jun. 22, 2012

(65) Prior Publication Data
US 2013/0001957 A1 Jan. 3, 2013

Related U.S. Application Data

(60) Provisional application No. 61/499,919, filed on Jun. 22, 2011.

(51) Int. Cl.
| | |
|---|---|
| *F22B 1/00* | (2006.01) |
| *H02K 7/18* | (2006.01) |
| *F01K 7/00* | (2006.01) |
| *F01K 13/00* | (2006.01) |
| *F03B 13/00* | (2006.01) |
| *F28F 9/02* | (2006.01) |

(52) U.S. Cl.
CPC . *F22B 1/00* (2013.01); *F01K 7/00* (2013.01); *F01K 13/006* (2013.01); *F03B 13/00* (2013.01); *F28F 9/0243* (2013.01); *H02K 7/1815* (2013.01)

(58) Field of Classification Search
CPC ........ F01K 3/247; F01K 13/00; F01K 17/04; Y02E 20/12; F22B 1/18; F22B 13/00; F22B 13/023; F01B 1/062; F01B 17/04
USPC .................. 60/670, 648; 110/238; 166/244.1
See application file for complete search history.

(56) References Cited

U.S. PATENT DOCUMENTS

| | | | | |
|---|---|---|---|---|
| 4,896,508 | A * | 1/1990 | Reinke, Jr. ...................... | 60/648 |
| 2006/0053793 | A1* | 3/2006 | Schoell ............................ | 60/670 |
| 2008/0017369 | A1* | 1/2008 | Sarada ........................ | 166/244.1 |
| 2009/0205338 | A1* | 8/2009 | Harmon et al. ................ | 60/677 |
| 2010/0095674 | A1* | 4/2010 | McMillan ....................... | 60/670 |
| 2010/0107637 | A1* | 5/2010 | Schoell ............................ | 60/670 |
| 2011/0000407 | A1* | 1/2011 | Bassett .......................... | 110/238 |

\* cited by examiner

*Primary Examiner* — Nicholas J Weiss
*Assistant Examiner* — Paul Thiede
(74) *Attorney, Agent, or Firm* — William S. Parks

(57) ABSTRACT

A specific electrical generator powered by an external combustion steam engine that functions through the initial combustion of various potential fuel sources to consequently generate steam from an internal working fluid that drives an electric motor or alternator to generate electricity is provided. The steam is then condensed to return to its liquid form in order to again be heated into steam through further combustion. The all-in-one electric generator combusts the fuel provided within the generator and incinerates such fuel in a manner and in an environment to effectively eliminate the potential for appreciable resultant levels of nitrogen and/or sulfur oxides. The combustion fuel may be any type of material, such as used vehicle or equipment oil, waste vegetable or cooking oil, diesel, gasoline, syngases, natural gases, and the like.

13 Claims, 19 Drawing Sheets

EXTERNAL COMBUSTION STEAM ENGINE ELECTRICAL GENERATOR HAVING A FUEL SYSTEM, AN ENGINE SYSTEM, AND AN ELECTRICAL SYSTEM ATTACHED AND CONFIGURED IN A STACKED OR SIDE-BY-SIDE RELATION WITH A SMALL TOTAL FOOTPRINT AREA

CROSS-REFERENCE TO RELATED APPLICATIONS

This application claims priority to U.S. provisional application Ser. No. 61/499,919 filed Jun. 22, 2011, which is hereby incorporated by reference in its entirety.

FIELD OF THE INVENTION

This invention pertains to a specific electrical generator powered by an external combustion steam engine that functions through the initial combustion of various potential fuel sources to consequently generate steam from an internal working fluid that drives an electric motor or alternator to generate electricity. The steam is then condensed to return to its liquid form in order to again be heated into steam through further combustion. The all-in-one electric generator combusts the fuel provided within the generator and incinerates such fuel in a manner and in an environment to effectively eliminate the potential for appreciable resultant levels of nitrogen and/or sulfur oxides. The combustion fuel may be any type of material that creates the necessary exothermic result upon combustion such that sufficient temperature is generated to produce steam from a working fluid source within the device itself. Such a fuel may be waste or used oil from vehicles or equipment, waste vegetable or cooking oil from restaurants, diesel, gasoline, synthetic gases, natural gases, methane and the like. Thus, the compact high kilowatt generating device is encompassed within this invention, as well as a method utilizing such a generator to that extent to provide electricity from a compact source into an electric power grid and/or to power lights, equipment, and the like, directly.

BACKGROUND OF THE INVENTION

There are many different electrical generators that have been developed through many years. Many rely upon the burning of fossil fuels (gasoline and diesel, in particular) to create heat that eventually transfers into energy (through various engine types, such as internal combustion and Stirling engines). Such fossil fuel combustion generators (as well as waste oil burning types), however, create problems with nitrogen oxide (NOx) and sulfur dioxide ($SO_2$) emissions and thus require caution and possible extra filter technologies to protect the user and the environment from such toxic releases (particularly due to the high temperatures required to incinerate liquid fuels that, in the presence of air, create such undesirable byproducts). As well, the specific types of fuel needed for such a device to function are usually limited and expensive due to necessary fuel refinements for such a purpose. Although the resultant kilowatt generation from such a device may be acceptable for short term purposes (power outages, for instance), such a device is highly undesirable in terms of providing electricity to a grid or for sustained periods of time, unfortunately.

Likewise, other past generators have relied upon internal combustion engines that exhibit bulky and/or extremely heavy configurations and require usage in a specific location. Such internal combustion devices have included Rankine cycle engines to provide steam generation and resultant power creation. Though effective in such configurations, these engines are actually rather elaborate and/or highly inefficient for such a purpose. As well, the utilization of typical combustion furnaces to heat a working fluid to its vapor phase has been followed in the past. Unfortunately, the continued feed of combustible fuel has created myriad problems in such a situation as the fuel needed (including waste oils) has been heated within a chamber that instantaneously combusts the subject fuel to the point of generating a high temperature but too quickly to properly and completely incinerate the waste oils themselves, thus leading to the unwanted creation of NOx and $SO_2$ emissions during continued water vaporization and eventual electricity generation. In other words, the prior designs for such devices have been limited in their fuel types (not to mention the proper balance of combustion and exhaust collection) to make it worthwhile for the user to provide a cost-effective electrical generator. As well, as alluded to above, the continued safety issues with fuel combustion exhaust issues renders such prior devices highly questionable in terms of availability at any desired location for actual long term use, particularly without the added expense of emission control components.

In a separate consideration, there exist particularly effective heat regenerative steam engines in U.S. Pat. Nos. 7,080,512, 7,856,122, and 7,992,386 (as examples), all to Schoell, that are configured specifically to be incorporated and introduced within a system wherein the source of water vaporization is waste heat from a manufacturing process. Such systems thus capture heat that typically is unusable and couples such a source with a working fluid that becomes steam (or a like vapor) in order to generate electricity through a modified multi-piston engine. No discussion is made of the potential for incorporating such a specific, effective steam engine with any other type of heat source, and no provision is made for the necessary components required to possibly utilize such a device with any type of heat source other than those specified as exhaust types from large-scale reactors. As such, although such a specific heat regenerative engine is effective in conjunction with certain waste heat sources, the investigation into any viability with any other types of sources, let alone separate engines incorporated directly into such a heat regenerative type apparatus, has not been explored, particularly in terms of a small-scale device, regardless of overall end result in terms of kilowatt generation.

There thus exists a definite need to provide a cost-efficient, effective, environmentally friendly, electrical generator utilizing low square footage genset technology. To date, unfortunately, the shortcomings of the prior devices delineated above leave a gaping omission in the types of generators available to such a degree within the electrical generator industry. This invention overcomes and provides, in a narrow scope, a device that meets all of those goals and with a capability to generate a high amount of kilowatts for introduction within an electrical grid and/or to power lights, equipment, and the like, directly.

ADVANTAGES AND BRIEF SUMMARY OF THE INVENTION

It is a distinct advantage of the present invention to provide a genset device that produces at least 6.0 kilowatts of electricity per hour of operation (preferably, at least 6.5, and more preferably at least 8.5) and that has a foot print of, at most, 4.6 square feet of area. It is another advantage of the inventive device and method to utilize the heat of a waste oil, syngases, natural gases, propane, methane, diesel, gasoline, and the like, directly connected to and present as the heat source for a heat regenerative engine to generate the minimum power levels noted above. Another advantage of this invention is the ability of the overall system to utilize a working fluid as a steam resource as well as an engine lubricant, all within a regenerative system that does not require any further introduction of working fluid therein. Additionally, another advantage of this invention is the capability to safely utilize air that is passed through the condensing system so as to provide a heat source within a certain space, open or confined.

Accordingly, this invention encompasses an all-in-one electrical generator that requires a total foot print of at most 4.6 square feet of area, wherein said generator includes a frame to which three separate major components are attached and configured in a stacked relation, or in a side by side relationship as the location may warrant, thereto, said components comprising: a) a heat generator component including i) a combustion chamber for the combustion and incineration of a volatile fuel that creates temperature sufficient to evaporate a working fluid into steam upon exposure thereto, ii) an ignition device to spark within said combustion chamber, iii) combustion air fans present within the combustion chamber, and, alternatively, iv) an air compressor (provided internally within or externally proximal to the system) to atomize a liquid fuel within said combustion chamber; v) a heat exchanger including at least one coiled tube within which a working fluid is present and which, upon exposure to the heat generated by said heat generator component, evaporates to become steam therein; b) a steam engine component including i) a plurality of radially configured pistons present in substantially the same plane through which said steam from said heat exchanger passes to create piston movement thereby, ii) rotating a drive shaft, iii) a condenser comprising a cooling area through which said steam passes subsequent to passing through said pistons, iv) a radiator, including a radiator fan to condense said steam into a working fluid condensate, v) a sump for collection of said condensate, vi) one pump to deliver at least a portion of said condensate to said heat exchanger for recycling therein and introduction back into said pistons, and vii) another pump to deliver at least a portion of said condensate to said pistons for lubrication thereof; and c) an electric generator component for which the movement of said drive shaft creates electrical charge; wherein said heat generator is connected directly to said heat exchanger to provide said sufficiently high temperature to said at least one coiled tube. Attached to such an electric generator may be any number of typical electrical system components to allow for transfer to either a specific piece of equipment or a power grid. The method of generating electrical charge through such a heat regenerative system is also encompassed within such an invention.

Such a device and method allows for the utilization of any type of fuel, including waste oils, syngases, and the like, as the heat source to generate sufficient heat for the evaporation of a working fluid within the subject system to ultimately drive the piston engine component to generate electricity through the creation of kinetic energy and transferring such through a dynamo or like device present therein. The small footprint of the overall device allows for a user to easily transport and situate the overall generator in many different locations. The stacked (or, alternatively, side by side) configuration of the device contributes to the small footprint as well. In a stacked configuration the beneficial placement of a combustion chamber above the engine allows for the working fluid to turn to steam above the piston engine with the subsequent transport of the resultant steam through the pistons facilitated by the pressures generated by the evaporative process. Thus, the resultant steam can move downward through the cooling condenser and radiator to permit recapture of the cooled steam as a liquid condensate in substantially the same condition as prior to introduction within the heat exchanger. The same result may be accorded through a side by side configuration as long as suitable pressures are present to cause proper transport of the steam through the engine pistons and to the recapture/cooling device. Likewise, in a stacked configuration, the presence of the heat generator on top of the device allows for heat/smoke exhaust to release at a higher elevation, thus avoiding any possible contact or involvement with the other generator components (particularly with the cooling/radiating portions that allow for working fluid recycling and reuse). A side by side configuration will facilitate placement of an exhaust pipe at a location away from such other generator components as well, if necessary. In either situation, the condensing system produces hot air through the process of cooling (condensing) the working fluid before it returned to the combustion chamber. Such a hot air source may also provide a benefit to the user for supplying heat to a confined or open space upon proper collection and direction away from the overall electrical generator. As such, then, the air venting from the condensing system may be configured not only to direct vent into the air, but it may be structured as a collection/transport device for a heat source for such a purpose. To that end, the inventive electrical generator may also be utilized as a space heater or heat source, as alluded to above, for any other purpose for which coupling with such a compact electrical generator may be suitable. Thus, connecting to a venting system or machine that can receive and transport heat in such a manner may be utilized to such an extent.

As it concerns the recapture and cooling of the working fluid (steam) within the overall inventive device, the pumps present thereon and therein actually permit transport of the resultant cooled liquid condensate to one of two locations and as one of two purposes: a) as an engine lubricant to reduce friction of the pistons during utilization; and b) as the source for steam generation within the heat exchanger component. If the working fluid transports to the piston engine for utilization as a lubricant, the liquid itself passes through the same condenser (cooler and radiator) as the steam, thus leading back to the same sump (reservoir and filter) and then to either of the two pumps (engine lubricant pump or heat exchanger feeder pump) for continued recycling in such a manner. As well, the heat exchanger feed is made through a series of pumps to create a higher pressure of the working fluid prior to introduction within the narrow coiled tube(s) therein; the coils within the tube may be of any number, although the greater the number within narrower tube diameters facilitates steam generation to a greater degree when exposed to generator's heat. Additionally, the high pressure pump allows for greater pressure of the generated steam to transfer such trough the steam engine component for piston movement as well as to force the steam through to the condenser, thus continuing the complete cycle. The electricity required to run the air compressor, pumps, the radiator fan, combustion air fan, and the ignition device within the heat generator may run from the charge created by the generator itself as well.

Thus, the all-in-one electrical generator only requires the continued introduction of a fuel source to generate electrical charge; no further introduction of working fluid is necessary for the device to function. As alluded to above, the stacked configuration of components allows for liquid condensation facilitation and proper heat exhaust from the heat generator component. Such a configuration thus permits an efficient electrical generator that has a very small footprint size wise and permits continued introduction of any type of volatile fuel source. The specific system allows for the utilization of waste oils (as one example), thereby permitting a means to reduce the potential for discharge of such undesirable materials into the environment. As noted above, however, the device may utilize any type of volatile material in liquid or gas form for such a purpose. If a waste oil (or like liquid source) is utilized for such a purpose, the combustion chamber includes a further refinement to assure proper incineration thereof, namely an atomizer attached to a feed pump and compressor to ensure the waste oil or like liquid is separated into droplets in the presence of the ignition component. If the waste oil or liquid were present in full liquid form (i.e., highly viscous), the potential to properly ignite the source would be extremely limited if not nonexistent. Thus, the necessity to reduce the waste oil or liquid to sufficiently small droplets permits complete ignition and full utilization thereof of the waste oil for, again, efficient and complete utilization of such a fuel source. An in-line heater may be present, as well, to properly heat the waste oil to a temperature that assists in the atomization and ignition process. Additionally, in some situations, the continuous transfer of such a liquid fuel source into the heat generator may prove difficult as any pressure build up or possible obstacles attributed to the atomization step may create a back-up in the feed line. To compensate for such a potential problem, the device may include an overflow protection component (siphon reservoir) wherein a feed line leads into a reservoir from which a transfer line leads to the heat generator; such a reservoir, however, is set within a larger reservoir that captures any overflow therefrom and is attached to a return feed line to the waste oil or liquid source to ensure the fuel will be eventually utilized for its intended purpose. Alternatively, the overall device may include a direct feed line for the liquid fuel source with a shut off switch in case of overflow or pressure build up problems. Of course, as noted above, if a gas fuel source is utilized, the atomizer would not be needed, nor any overflow protection of the type described. A direct feed line for a gas line may be used with a shut off switch as well in such a situation.

In greater detail, the steam engine component, as alluded to above, includes a steam line in contact with and thus exposed to the heat generated within the heat generator component, the steam line(s) having an exposed surface area allowing heat transfer in order to change the phase of working fluid within said steam line from liquid to steam. The resultant steam is then delivered to an injector valve within the engine (for passage through the pistons) as well as an exhaust transfer passage for delivering exhaust steam from at least one piston (cylinder) to the condenser. At that point, the exhaust steam changes phase into a liquid in said condensing system prior to collection within a sump (reservoir). Subsequently, the collected condensed working fluid either returns to the steam line or is transferred directly to the engine as a lubricant.

The engine itself is a drive assembly comprising a plurality of cylinders configured within a single horizontal plane with a related number of pistons movably captivated within each related cylinder and including a piston head structured and disposed for sealed, reciprocating movement within each cylinder; a crankshaft or drive shaft; a crank cam fixed to said crankshaft and rotatable therewith; a connecting rod pivotally connected between said piston and said crank cam; and an injector valve operable between a closed position and an open position to release a pressurized charge of steam into a top portion of said cylinder. Such an engine is thus connected with the steam line described above to allow for the pressurized steam injection to drive the pistons therein in such a manner as to generate sufficient kinetic energy to create rotational movement within the attached electrical generator present below the engine component itself. Such an electrical generator is a typical dynamo, as one example, that permits the rotation of a magnet in the vicinity of a metal coil to generate and capture electrons.

Thus, the overall device does not waste any of the fuel source needed to generate the proper heat levels to cause vaporization of the working fluid (such as deionized water into steam; other working fluids may be employed as well, such a toluene, for example, to create the same high pressure vaporization thereof) in order to contribute the necessary high temperature steam (or other working fluid result) to initiate the steam engine operation. Subsequent to the steam driving the pistons, etc., of the particular steam engine, the high temperature and pressure vapor is then condensed within the condensing system noted above in order to reform as the starting working fluid. As further fuel source materials are combusted and incinerated, the working fluid is continuously subjected to the high temperatures thereby and the process starts again, ultimately generating at least 6.0 kilowatt per hour of electrical power.

The all-in-one device thus permits the continuous reusability of the particular working fluid utilized therein through thermodynamic and condensation processes. The only necessary actions taken by the user in some fashion would be the continued introduction of proper combustible waste oil or other combustible fuel that can easily create the needed high temperatures to vaporize the subject working fluid. The incineration step is undertaken, as well, within a proper environment to avoid the generation of inordinate amounts of nitrogen and/or sulfur containing gases and thus, even upon high temperature incineration (and thus oxidation), undesirable nitrogen and sulfur oxides are avoided, thus providing a safer electrical generator to that extent. The exhaust from the fuel combustion/incineration still must be dealt with, but coupled with the cleaner burning gases in terms of potentially dangerous oxides, as well as the potential to remove waste oils from the environment in general provides a much improved environmental impact than for other devices for this electrical generation purpose.

Additionally, the provision of a compact all-in-one device including a combustion chamber and a steam engine with pistons exhibiting radial cylindrical configurations provides a capability in terms of electrical generation that has heretofore been difficult if not impossible to attain from a power per square footage perspective with the fuels identified. The 4.6 square foot all-in-one device provides this highly desirable benefit, particularly in terms of allowing a user the possibility of creating sufficient power to augment the electrical requirements within a facility, reducing the electrical power needed during operation, reducing the cost impacts of a facility peak power demand, and/or the capability of generating revenue through the sale of power to a local electrical grid. The compact configuration allows for ease in transportation and shipping as well as a rather easy manner of finding a proper location (from a ventilation as well as heat sensitivity perspective, at least) for placement during utilization. As well, such a small and compact size facilitates the ability of the user to move the device to any place for grid and/or electrical panel connections, too.

Thus, the device itself includes all of the specific components required of the specific steam engine component as well as the proper connections between that component and the combustion chamber (heat generation) component to allow for the proper, continuous (on-demand), and effective generation of heat from the incineration of the selected fuel source. Such will be described in greater detail below, but of great necessity for this particular device and method to be utilized, and, in particular, to be properly configured to allow for proper transfer of the fuel source through the combustion chamber component of the all-in-one device. This process step utilizes an oil pump (for waste oil) or proper supply tubes (for gaseous fuels) in order to introduce the fuel source into the combustion chamber, initially through the aforementioned dual container reservoir or direct feed line. The waste oil or other fuels is provided in an external tank (that is not considered part of the inventive all-in-one device) and is connected through a proper pipeline in the manner described above. The fuel source is then moved through the pipeline (again, via either an oil pump or siphon line) through a filter (to remove large debris or other undesirable materials, such as dirt, for instance) and then introduced within the combustion/incinerator chamber (with optional pass through a dual container siphon reservoir in order to allot the proper amount of fuel; the optional reservoir is not needed for gaseous fuel because the phase it is in, as noted above). Being of a relatively small and compact structure, the proper configuration to create such a result without appreciably effecting the other components of the overall device is of great importance. The fuel then travels from the reservoir to the heater(s) which provides sufficient heat to increase the temperature of the waste oil fuel source to allow for proper and immediate atomization and ignition, but prior to actual incineration thereof. The power for the heater(s) is initially provided through the electrical panel/grid tie or an electrical battery. The heated fuel source is then moved into the actual combustion/incineration chamber. Being of a relatively small and compact structure, the proper configuration to create such a result without appreciably effecting the other components of the overall device is of great importance.

The all-in-one device design is a tower configuration with a proper exhaust port at the top portion thereof, and a rectangular bottom portion that is in contact with a relatively flat surface for proper stability. The maximum overall height of the device is roughly 56 inches, while the square bottom portion is, as noted above, about 4.6 square feet in area at a maximum and as an optimal dimensional measurement.

DETAILED DESCRIPTION OF THE PREFERRED EMBODIMENTS AND THE DRAWINGS

In order to provide greater detail of the inventive electrical device, non-limiting drawings and descriptions thereof. The ordinarily skilled artisan would understand that the scope of the overall invention is not intended to be limited in view of such drawings and descriptions.

Figure 1:
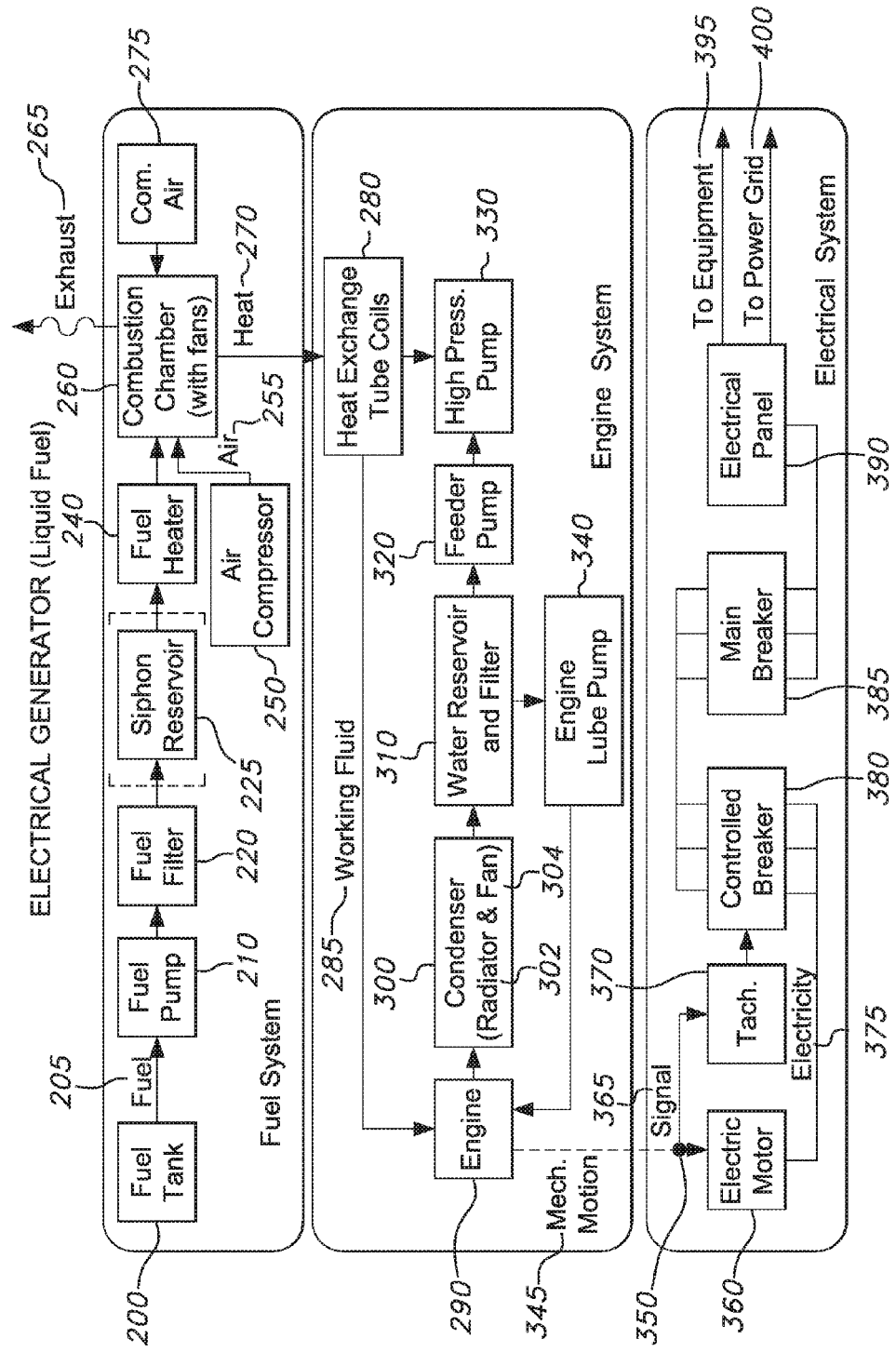
FIG. 1 is a flow chart diagram of the overall electrical generation system described herein utilizing a liquid fuel combustion method.
Figure 5:
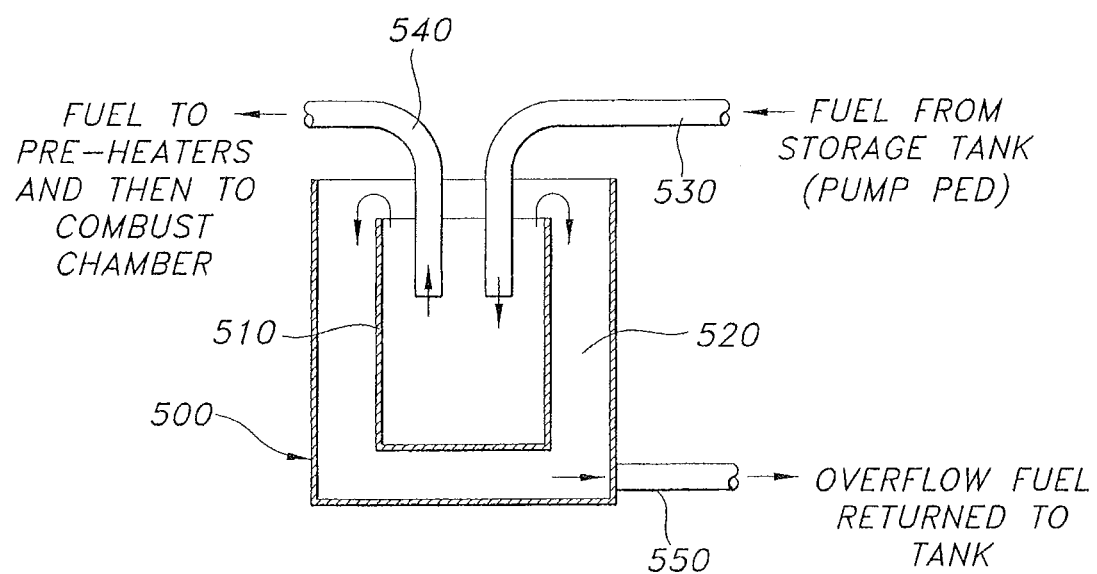
FIG. 5 is a side cross-sectional depiction of a potentially preferred embodiment of a double wall siphon reservoir present within the inventive electrical generation device.
Figure 6:
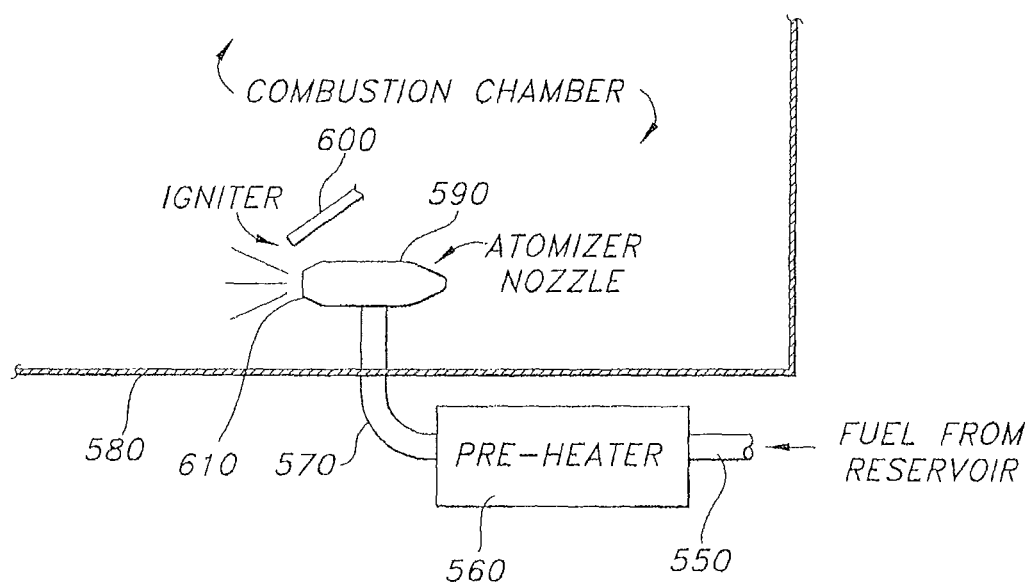
FIG. 6 is a side cross-sectional depiction of an embodiment of the internal portions of the combustion chamber of the inventive electrical generation device for the incineration of liquid fuels.

In accordance with a preferred embodiment hereof, FIG. 1 shows the overall inventive method followed in flow chart format. The overall system includes three distinct subsystems, being the fuel subsystem, the engine system and the electrical system. All three are sequentially connected to one another to provide electrical generation capability through the burning of a fuel within the fuel subsystem to create heat 270 to generate steam 285 to run the engine 290 in the engine subsystem which, in turn allows for electricity 375 to be generated by a motor 360 within the electrical subsystem. Within the fuel subsystem fuel is stored in a fuel tank 200 (which may be replenished as needed externally). The fuel 205 is transferred via a pump 210 through a filter step 220 then to a pre-heater 240. Optionally, the system may include a direct feed line or siphon reservoir 225 such as shown in FIG. 5, to distribute a suitable amount of fuel in an efficient manner through to the combustion chamber 260. Otherwise, a direct feed line transfers the fuel in such a manner. The pre-heating step 240 heats the fuel to a temperature between 120 and 160° C., which then leads the pre-heated fuel to a nozzle present within the combustion chamber 260 for atomization and incineration in order to generate heat 270. The preheating step 240 particularly facilitates atomization thereof (such as shown in FIG. 6) by generating the proper viscosity to, in turn, facilitate incineration within the combustion chamber 260. Atomization is facilitated by the introduction of air 250 through a compressor, as well. Upon combustion (incineration) 260, the exhaust is generated and released into the surrounding environment 265. The resultant heat 270 generated from the combustion step 260 is then captured and transferred to the engine subsystem.

Within the heat subsystem, the heat 270 from the fuel subsystem is exposed to heat exchanger tube coils 280 within which is present a working fluid that evaporates to form steam 285 therein. This steam/working fluid 285 is then transferred to a multi-piston engine 290 whereupon the steam pressure forces the pistons therein to move back-and-forth within cylinder housings (as in FIGS. 7 through 12D). The steam is then condensed 300, through exposure to a radiator 302 and a cooling fan(s) 304 to lower the temperature of the working fluid to create a liquid condensate stored within a reservoir 310 (including a filter to remove any impurities). The condensed working fluid is then transferred to one of two pumps: a feeder pump 320 moves the working fluid to a high pressure pump 330 for reintroduction within the heat exchanger 280, while and engine lube pump 340 transfers the condensed working fluid into the piston engine 290 to act as a lubricant therein.

The moving pistons of the engine subsystem are connected to an electric motor 360 through a crankshaft (as in FIG. 4), to transfer the mechanical energy 345 generated thereby to a generator/electric motor 360 (such as a dynamo) to create electrical charges as a result. The crankshaft motor assembly 360 is connected to a tachyometer 370 that reads the signal 365 from the motor 350 to indicate the speed of the motor during use. The motor 360 can thus generate a certain amount of electricity 375 from such mechanical energy 345, sending such electrical signals and charges to a controlled relay 380, a main breaker 385, and then to an electrical panel 390 to permit the controller to decide the target destination of the generated electricity, whether it be a power grid 400 or a stand-alone piece (or pieces) of equipment 395.

Figure 2:
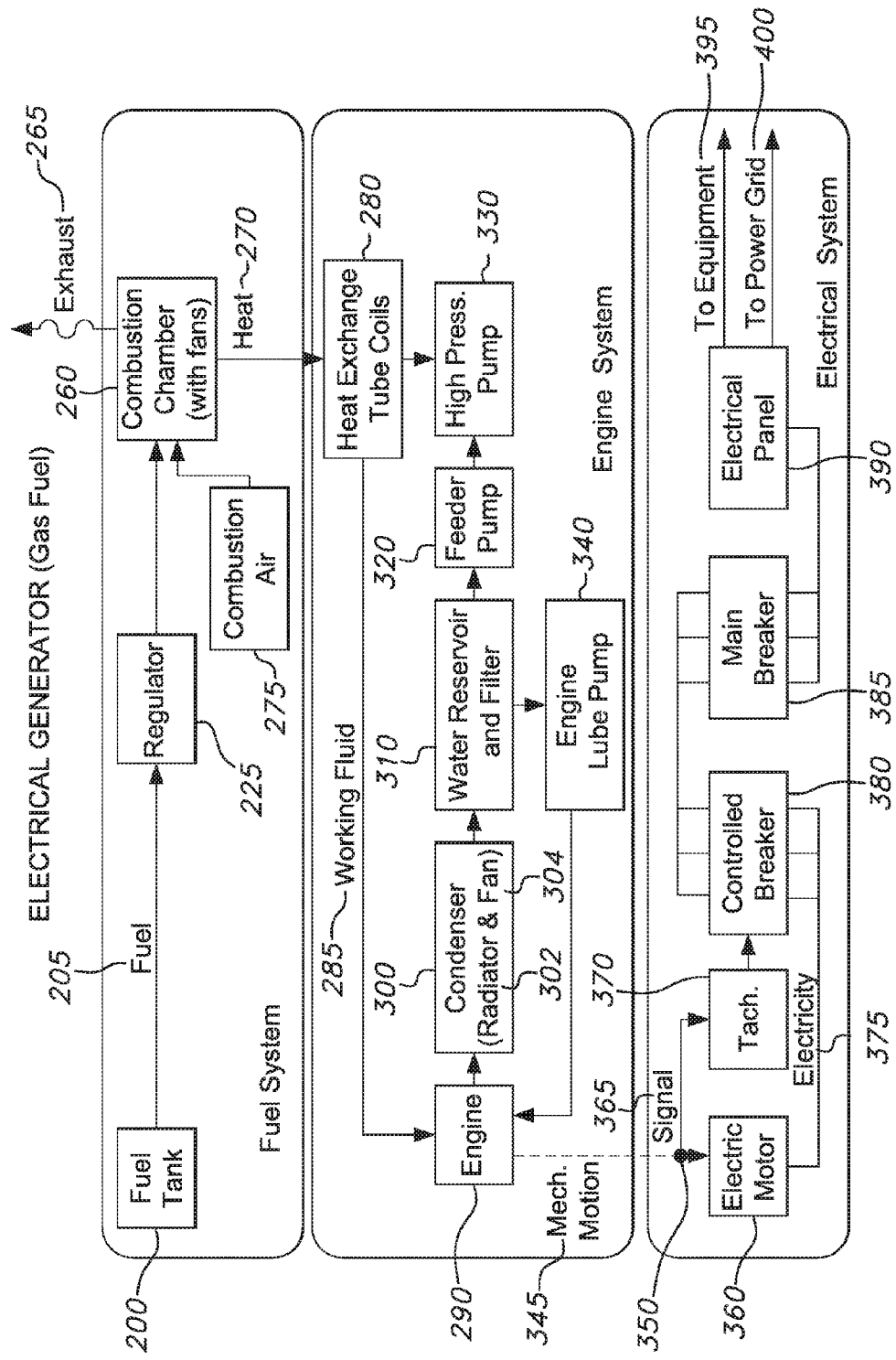
FIG. 2 is a flow chart diagram of the overall electrical generation system described herein utilizing a gaseous fuel combustion method.

FIG. 2 provides an alternative device but utilizing gaseous fuels, rather than liquid fuels. In such a device, there is a direct feed into the incinerator step 260, instead, and no atomization component necessary.

Figure 3:
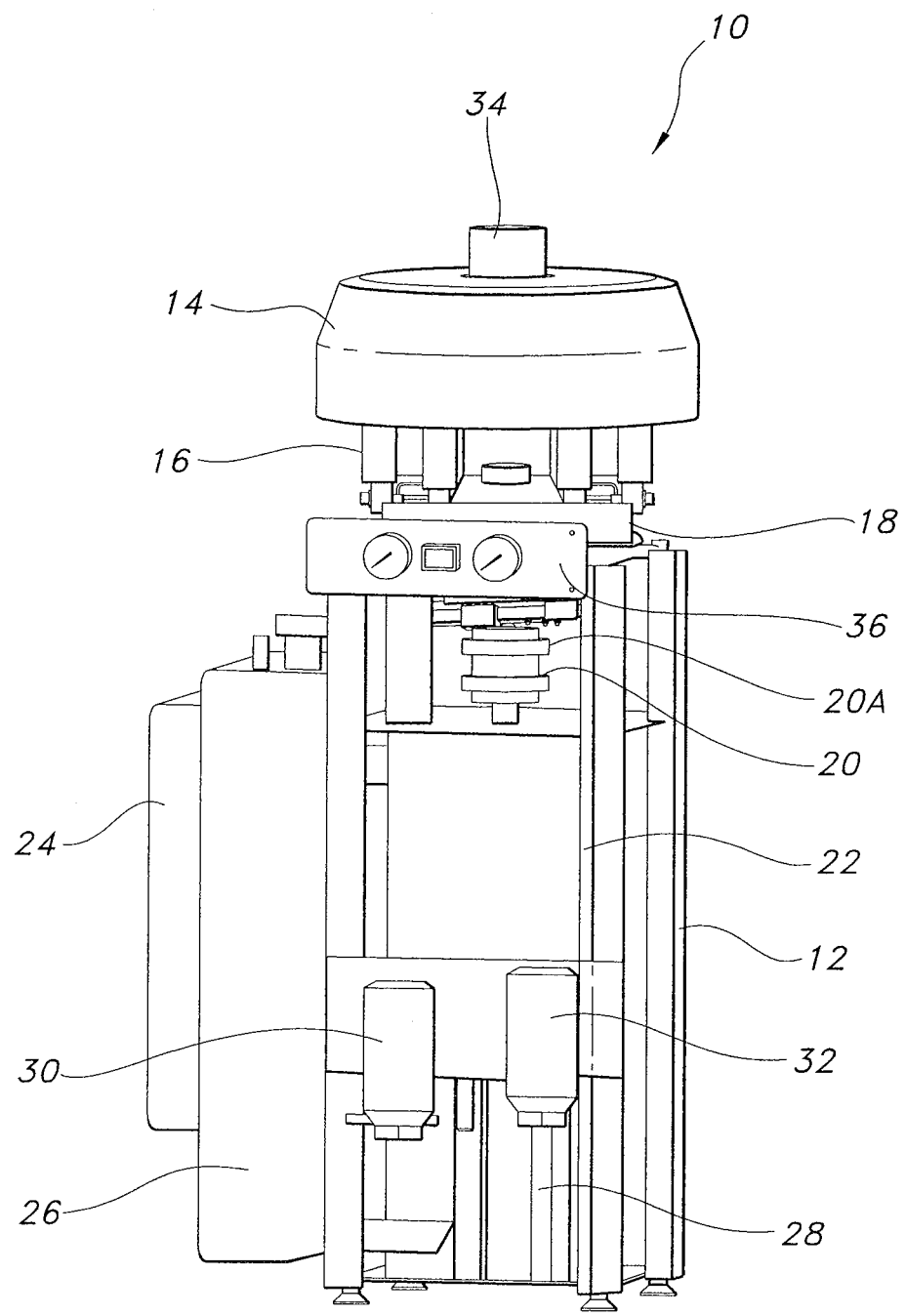
FIG. 3 depicts one potentially preferred embodiment of the overall electrical generation system as depicted in FIG. 1.

With such an overview, there is provided, in FIG. 3, a low-footprint electrical generation device 10 that weighs approximately 600 dry weight pounds and requires only 4.6 square feet of space (and a proper location for the exhaust and any heat to dissipate safely). The device 10 is present on a 4-legged frame 12 to allow for the vertical placement (i.e., stacked configuration) of the individual components (as defined in FIG. 1 as the subsystems, in essence). At the top of the device 10 resides a combustion chamber 14 that is structured to allow for a heat exchange unit to rest comfortably therein and in sufficiently close proximity to an incinerating component (as in FIG. 6, for instance). As well, the combustion chamber provides a cyclonic movement of the heat generated therein to provide thorough exposure to the coils (160 in FIG. 4, for example) present within the heat exchanger component. An exhaust pipe 34 is present in the middle and atop of the combustion chamber 14 to permit proper release of incinerated fuel exhaust. A working fluid (such as tap water, deionized water, toluene, a low carbon alcohol, and the like) is present therein said coils during the incineration step within the combustion chamber 14. Upon exposure to sufficient heat therein, the working fluid evaporates to form a steam (at temperatures between 400 and 1,000° F.) which is then pumped through insulated steam lines 16 on the device 10 downward to a multi-piston engine 18. The pistons (as in FIGS. 7 through 12D) are then permitted to stroke through the steam presence, thereby creating mechanical energy that is then transferred via a crankshaft 20 to an electrical generator 22. A crankshaft coupling 20A is provided to prevent the spinning of the electric generator 22 to drive the engine 18 if the engine 18 slows or stops operating. Simultaneously, the working fluid in steam form subsequently moves from the engine 18 to a condenser unit 23, including a radiator 26 and cooling fan(s) 24 to which all liquid condensate is then moved to a water reservoir 28. The supply of working fluid is then transported back to the heat exchanger within the combustion chamber 14 via a feeder pump 32 or sent directly to the engine 18 to act as a lubricant therefore. Additionally, gauges 36 are included to monitor pressures, RPMs, and other like physical properties throughout the overall device 10.

Figure 4:
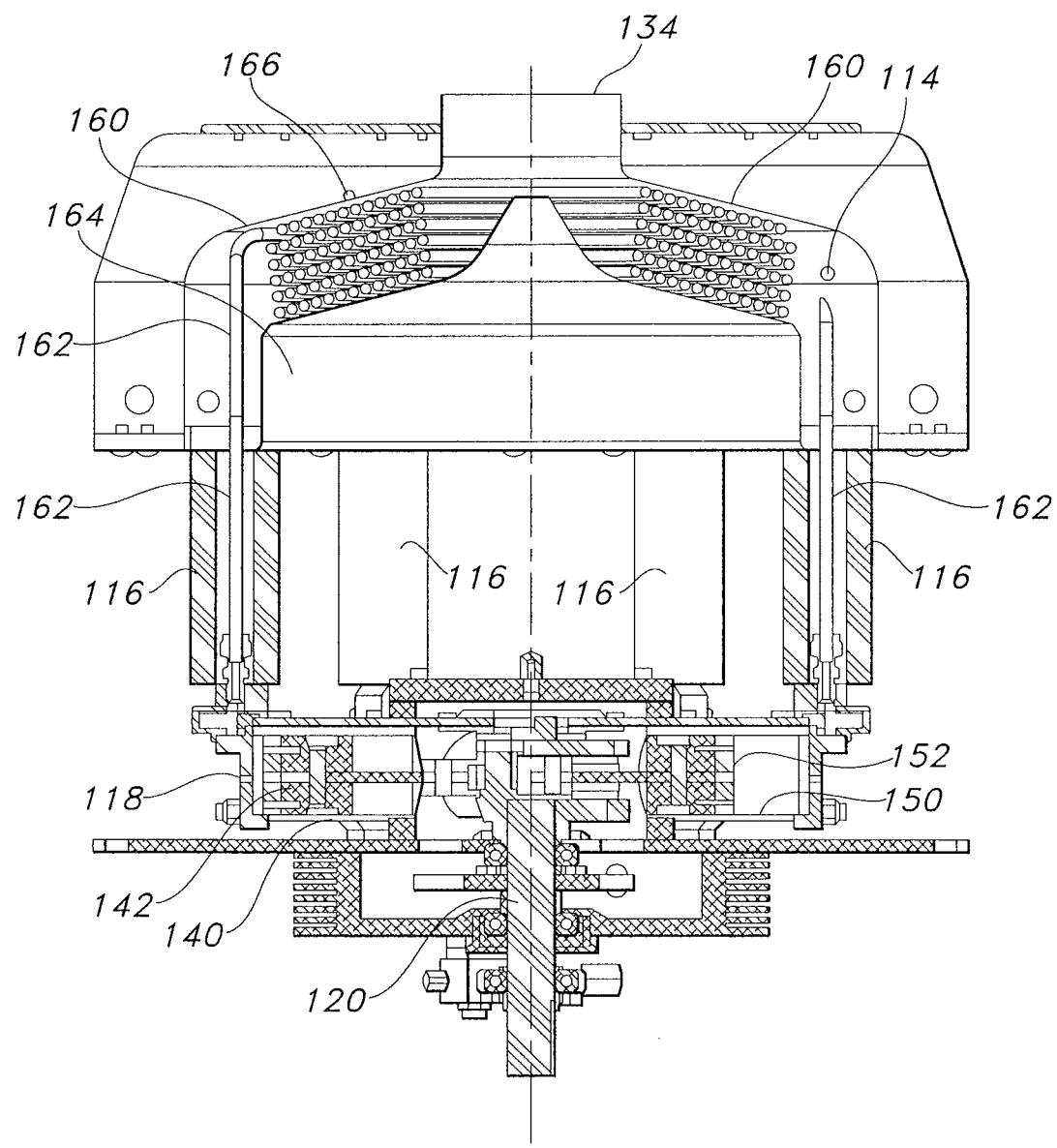
FIG. 4 is a side cross-sectional depiction of the combustion and engine components of the electrical generation device shown in FIG. 3.

FIG. 4 shows the internal components of the fuel and engine subsystems of the inventive device of FIG. 3. The combustion chamber 164 is covered by an insulated shroud 160 (made from a suitable metal to withstand high temperatures and to maintain internally generated heat therein) within which is housed an incinerator (FIG. 6). The chamber 164 is configured to allow for cyclonic circulation of heat around heat exchanger coils 114, 166 made from, as one example, stainless steel. A working fluid is introduced within the coils 114, 166 through a pressure pump upon recycling from the engine (18 of FIG. 3), whereupon the surface area for heat exchange accorded by the coils 114, 166 facilitates steam generation in an efficient and effective manner. Insulated steam lines 162 housed within transfer lines 116 are directed to the engine cylinder 118 to allow for transfer of the steam to the engine (18 of FIG. 3). An exhaust pipe 134 dissipates exhaust from the incinerator into the surrounding environment.

The steam lines 162 thus move steam into a manifold 524 that leads to the engine cylinders 140, 150 of the engine 141, to drive the pistons 142, 152 in order to generate mechanical energy through continued stroking of the pistons due to the steam moving there through. The pistons 142, 152 include connectors 118 that are connected to a camshaft 120 that translates the piston movements downward to an electrical generator.

Figure 3A:
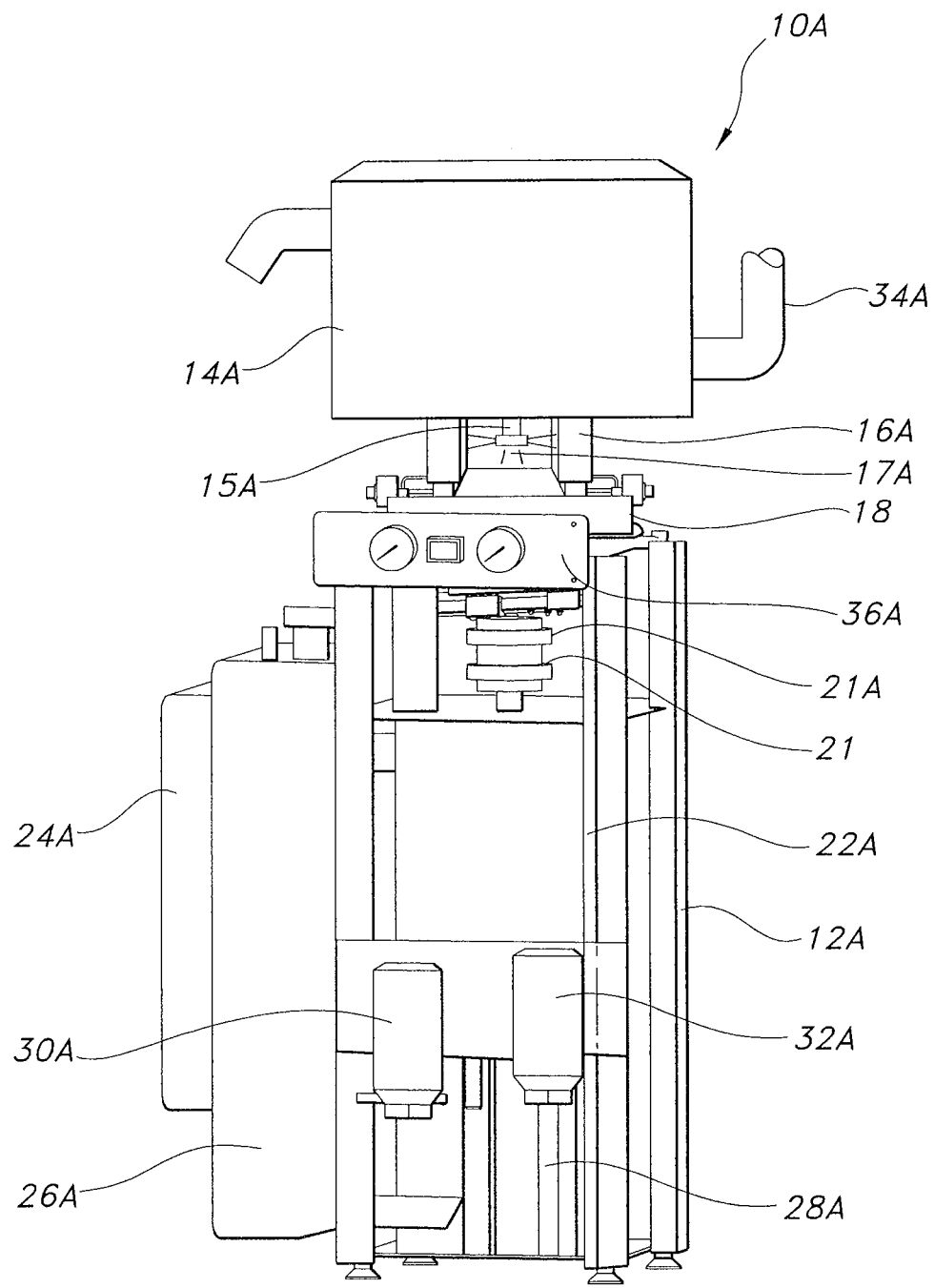
FIG. 3A shows an alternative potentially preferred embodiment of the overall electrical generation system with a different combustion chamber and feed line.

FIG. 3A shows an electrical generation device 10A with the same basic engine and recirculation components of the device 10 in FIG. 3 (and all the parts of FIG. 3 that are present in FIG. 3 are denoted with the same reference numbers, but with an "A" suffix). The different combustion chamber 14A is rectangular in shape with an exhaust pipe 34A on its side (rather than out its top). As well, the steam feed lines 17A lead through a center feed 15A rather than through four separate lines (as shown by 16 in FIG. 3).

Figure 4A:
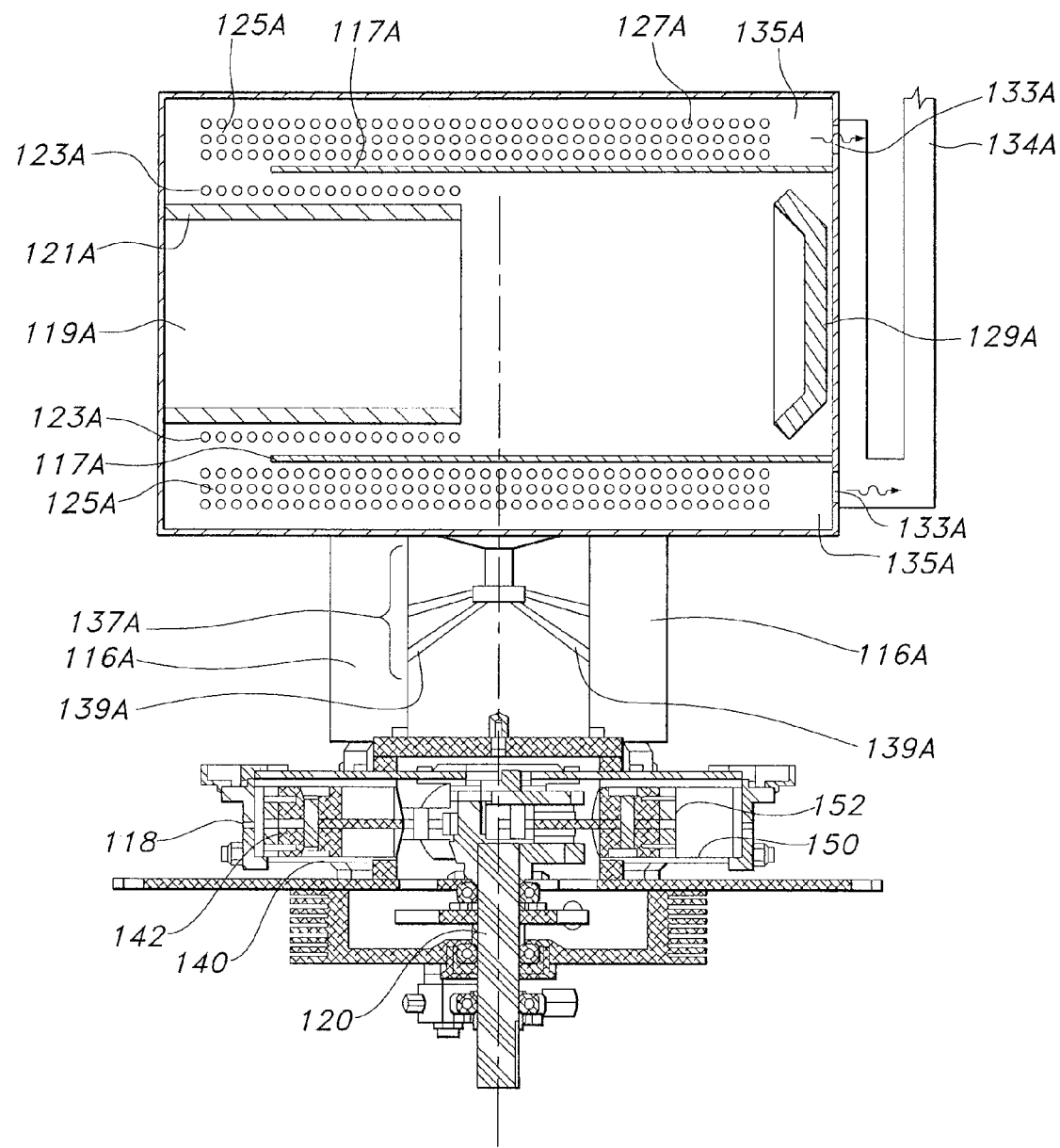
FIG. 4A is a side cross-sectional depiction of the alternative potentially preferred electrical generation device shown in FIG. 3A.

FIG. 4A shows the internal components of the rectangular combustion chamber 115A (14A of FIG. 3) including a heating manifold 119A formed by a refractory tube 121A around which working fluid transporting coils 123A are wound. An energy retention disc 129A reflecting plate is present on the opposite end of the chamber to permit the generated heat to circulate through the manifold to allow for efficient and optimal exposure of the working fluid coils 123A. The working fluid can then be properly heated upon the combustion step to create the necessary steam for eventual transport to the engine device 118 through transfer lines 116A, 137A, 139A. Open space resides within the manifold 119A and within the spaces in which the working fluid coils 123A are present to allow for further and maximum exposure to the generated heat from the combustion of the fuel/gases. A pass divider 117A is present to create a surrounding chamber 135A within which further delivery coils 125A are present around the entire manifold 119A. This surrounding chamber 135A leads to exhaust ways 133A that lead to a shared exhaust pipe 134A to delivery the exhaust gases subsequent to combustion and heat exposure for the working fluid. The delivery coils 125A lead the steam (former working fluid) to a central steam feed line 137A that, in turn, shunts into separate feed lines 139A in a radial fashion to steam feed lines 116A on to the engine 118. Such a different combustion chamber provides highly effective and efficient steam generation through proper exposure to high temperatures subsequent to combustion of the fuel. If desired, however, the working fluid coils 123A may be present over the entire manifold 119A; however, it has been realized that the capability of providing greater open space within the manifold to allow for greater retention of high temperatures for more effective steam generation, as well as potentially longer retention of steam for transport through the engine for more reliable and efficient electrical generation.

The working fluid coils (tubes) within either of the potentially preferred, non-limiting, combustion chambers described in relation to FIGS. 4 and 4A, above, may be of any length and diameter to fit within the spaces provided and to allow for optimal exposure to combustion heat sources to cause the working fluid therein to become gaseous in nature. Thus, tube coils with outer diameters of from ¼ inch to ⅝ inch, preferably about ⅜ inch, with a number of coils (turns) from 35 to 45 around the combustion chamber (in FIG. 4 circling the chamber, in FIG. 4A surrounding the refractory tube). Additionally, the further coils (tubes) that lead from the combustion chamber to the feed lines to the engine are similar in configuration, as well.

As noted above, one alternative to prevent overflow and/or pressure buildup of liquid fuel as it is fed to the combustion chamber is a reservoir designed to permit efficient utilization of fuel supply (again, a direct feed line may provide an effective remedy for such potential problems, as well). In one potential embodiment, a double-walled siphon reservoir is included for this purpose. FIG. 5 shows such a potentially preferred reservoir 500 with an inner chamber 510. The space between the two chambers 520 continuous holds overflow from the inner chamber 510 with a tank line 550 leading back to the fuel tank (200 of FIG. 1). In this manner, a reservoir line 530 transfers fuel from the tank to the inner chamber 510, where the fuel is deposited within the inner chamber 510 for siphoning by a combustion line 540 to deliver fuel to the combustion chamber (14 of FIG. 3). Since the amount of fuel to be siphoned by the combustion line 540 is rather small, but the continued delivery of appropriate amounts of fuel is necessary to continuously operate the overall device, the double-walled reservoir 500 provides this capability without wasting any of the fuel source itself.

With a liquid fuel source, the combustion step may require means to increase the available surface area of the fuel, particularly to reduce the temperature necessary to effectuate proper and complete incineration of the fuel itself. To that end, FIG. 5 provides one potentially preferred embodiment includes an atomizer component 575 within and attached to the combustion chamber 580. The component 590 includes a fuel pre-heater 560 to which a combustion line 550 from the fuel reservoir (as in FIG. 5) is attached for the delivery of liquid fuel thereto. The pre-heater 560 increases the fuel temperature to an initial level of 120 to 160° C. in order to facilitate atomization thereof. An atomizer line 570 then leads into the combustion chamber 580 and directly to the atomizer device 590 which subsequently separates the pre-heated liquid fuel into any range of sizes from droplets to a fine mist. The resultant atomized liquid exit's the atomizer 590 into the presence of an igniter 600 whereupon the resultant atomized fuel is ignited (in the presence of oxidizer) to generate sufficient heat to then transfer to the heat exchanger (160 of FIG. 4).

The continued generation of heat through these procedures, thus leads to the transfer of steam to a steam engine for mechanical energy generation. The potentially preferred engine is provided in FIGS. 7 through 12D. Referring to the several views of these drawings, and initially FIG. 4, the steam engine component of the present invention is shown and is generally indicated as 10. An upper portion 12 of the engine 10 has a radial arrangement of cylinders 20. Low pressure (i.e., generally between 20 psi-200 psi), low temperature (i.e., generally between 400° F. to 1000° F.) steam is generated from the combustion chamber (14 of FIG. 3, 14A of FIG. 3A). The low pressure, low temperature steam is directed through a steam line (16 of FIG. 3, 15A of FIG. 3A) that connects to a steam inlet port 19 on a generally circular manifold 18 that is supported on the upper portion 12 of the engine 10. Manifold 18 is structured and disposed to equally distribute the low pressure to intake valves at each cylinder 20. A central portion 14 of the engine 10 includes the condenser 30 including a chamber 32 that is surrounded by a folded star-shaped condenser wall 34. The steam present within the steam line (16 of FIG. 3, 16A of FIG. 3A) and that is transported through the engine 10 is sent through a cooling fan (24 of FIG. 3, 24A of FIG. 3A) and radiator (26 of FIG. 3, 26A of FIG. 3A) to condense and is either returned to the combustion chamber (14 of FIG. 3, 14A of FIG. 3A) or to the engine 110 as a lubricant and coolant. A fluid pump 136 on the engine is driven by rotation of the crankshaft (20 of FIG. 3, 20A of FIG. 3A).

Figure 7:
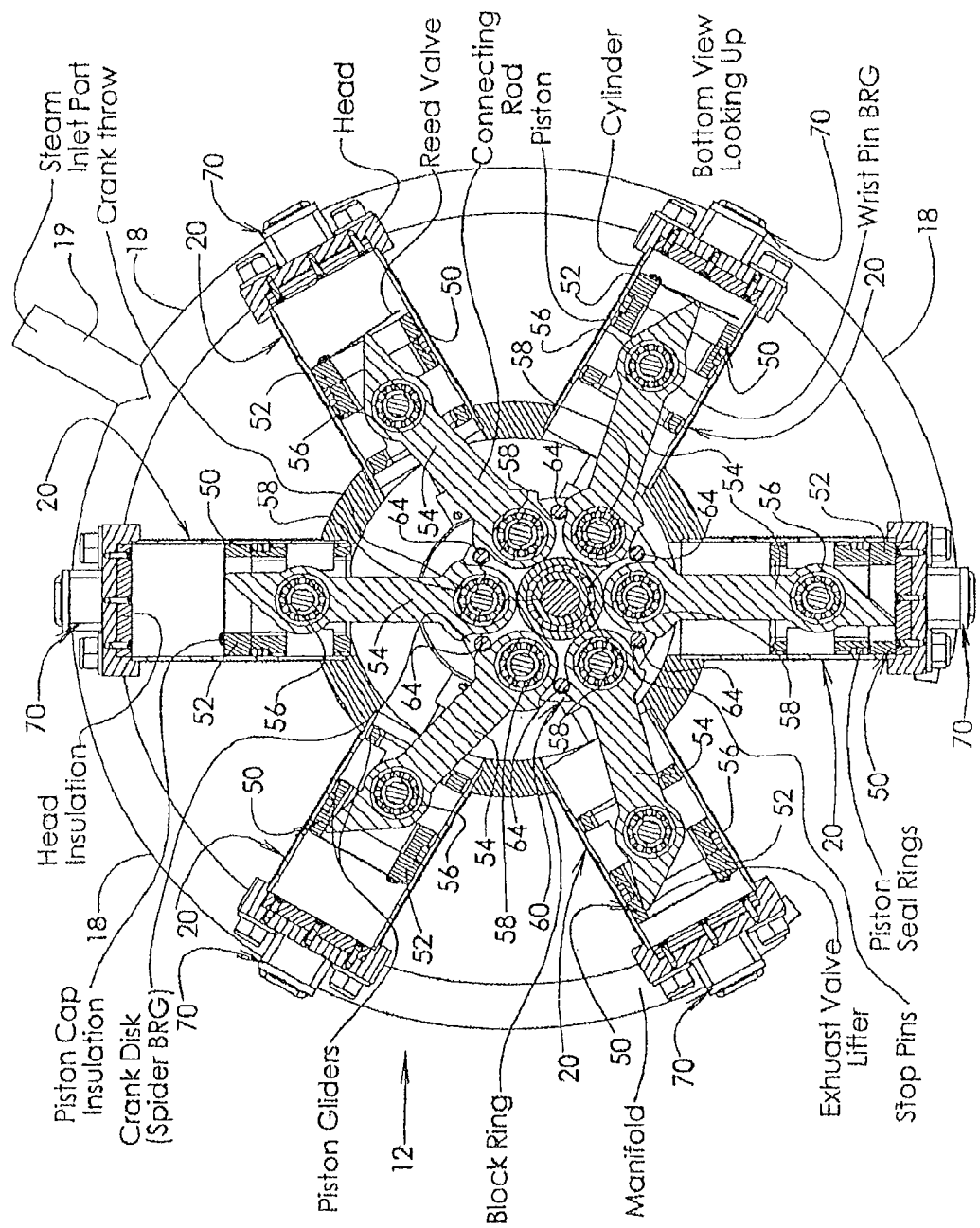
FIG. 7 is an isolated top plan view showing a spider bearing (i.e., crank disk) and a piston and cylinder arrangement of the waste heat engine.

Referring to FIG. 7, each cylinder 20 in the radial arrangement includes a reciprocating piston assembly 50, including a piston head 52 that moves in a reciprocating motion within the cylinder 20 through a full piston stroke. A connecting rod 54 is pivotally linked to the piston head 52 and a central crank disk or spider bearing 60. More specifically, the connecting rod 54 of each piston assembly 50 is pivotally linked at an upper end to the piston head 52 with a wrist pin bearing 56. Similarly, a lower end of the connecting rod 54 is pivotally linked to the crank disk 60 with a wrist pin bearing 58. The crank disk 60 is eccentrically fixed to the crankshaft 24. More particularly, a crank arm on the crankshaft 24 is rotatably fitted to the center of the crank disk 60 so that the center of the crank disk 60 is offset relative to the longitudinal axis of the crankshaft 24. As steam is injected into the top of each cylinder 20 and the piston 52 is moved downwardly within the cylinder, the connecting rod 54 pivots and transmits a force on the crank disk 60 that is offset relative to the longitudinal central axis on the crankshaft 24, thereby causing the crank disk 60 to move in an orbiting motion around the central longitudinal axis of the crankshaft 24, as the crankshaft is turned. Movement on the crank disk 60 about a full orbital motion, with a complete turn of the crankshaft 24, causes the lower pivoting end of each connecting rod 54 to travel through a circular path, as indicated by the arrow in FIGS. 12A-12D. Restrictor pins 64 associated with each cylinder are fixed to the crank disk 60 and are specifically spaced and arranged relative to one another so as to abut against ears 59 on the lower end of the connecting rod 54 to limit angular deflection of each connecting rod 54.

Figure 8:
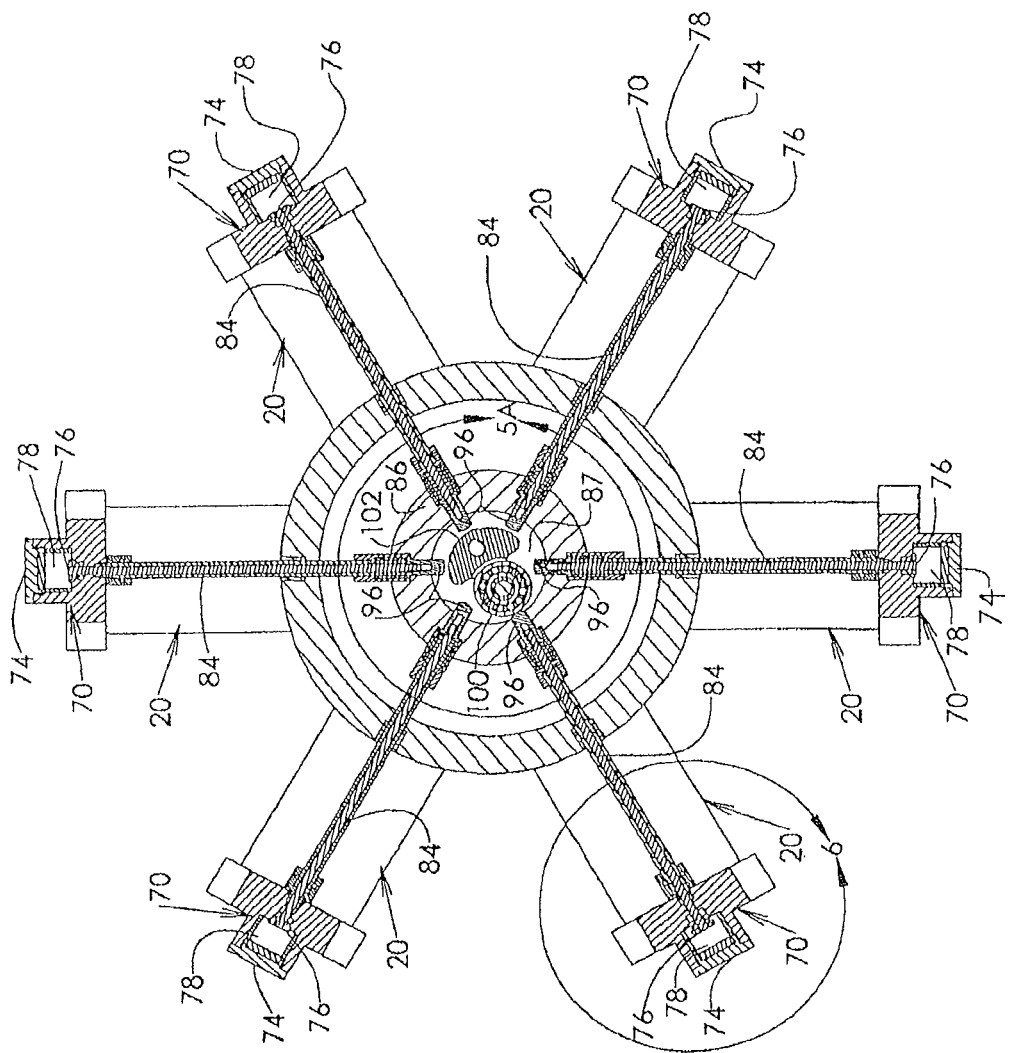
FIG. 8 is an isolated top plan view in cross-section, showing a steam intake valve and intake valve control assembly for controlling a low pressure steam or gas injection into each of the cylinders of the waste heat engine.
Figure 9A:
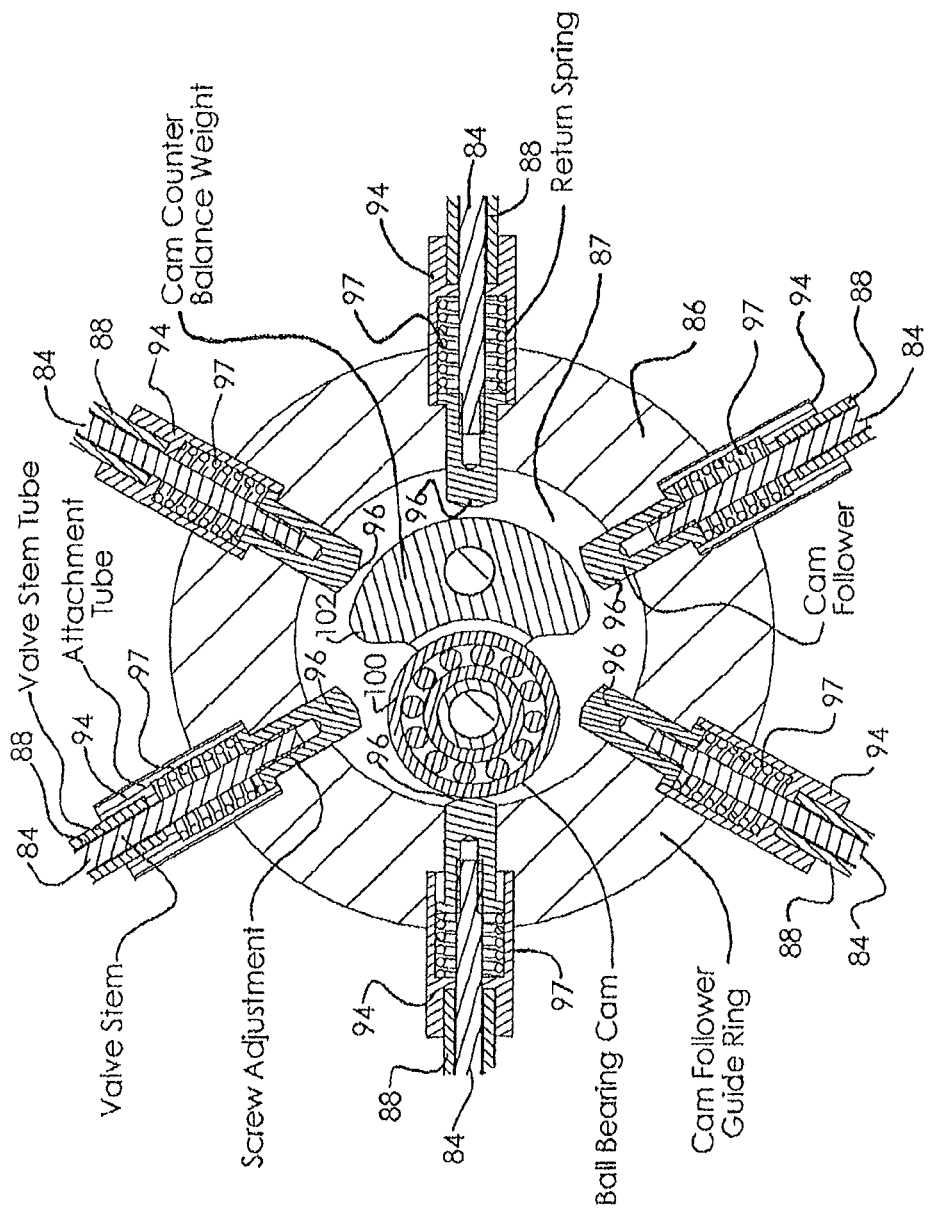
FIG. 9A is an isolated top plan view, shown in cross-section, taken from the area indicated as 5A in FIG. 8 showing a bearing cam roller positioned in contact with one cam follower on an inboard and of a valve stem, thereby urging the intake valve on the opposite end of the valve stem to an open position.
Figure 9B:
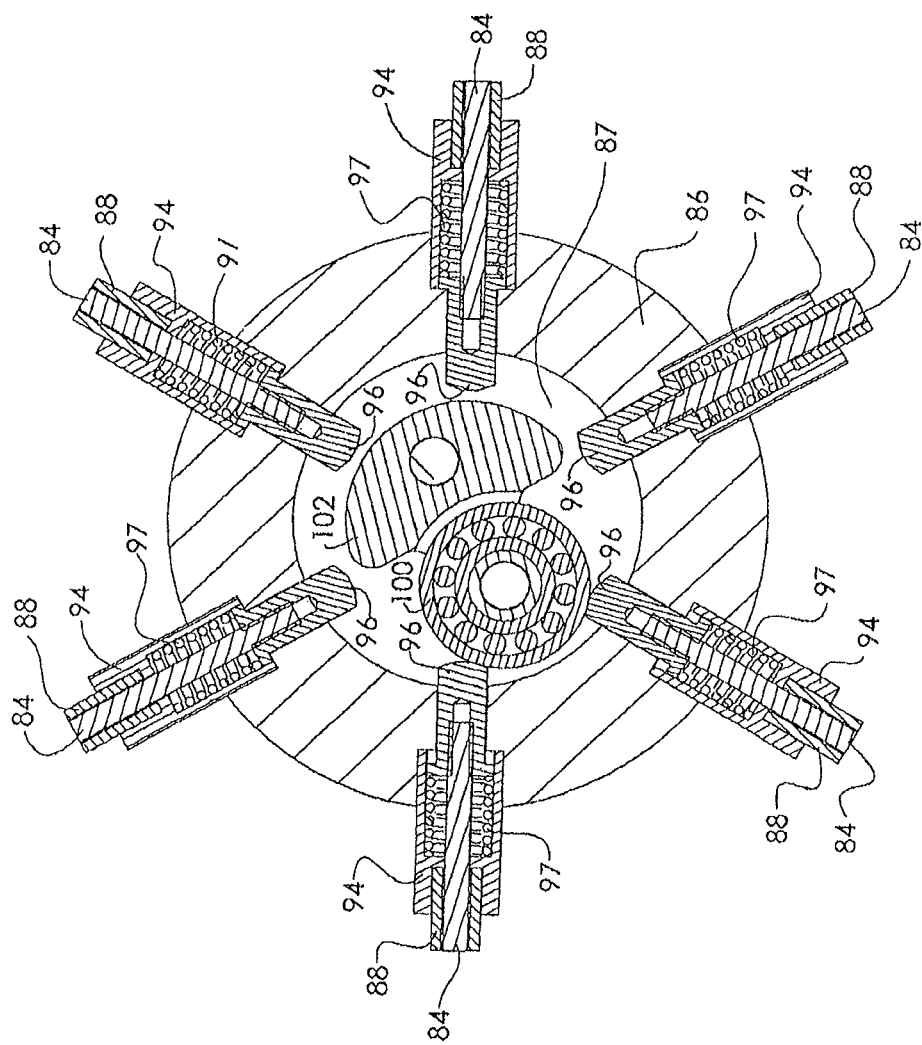
FIG. 9B is the same isolated cross-sectional view as shown in FIG. 9A, with the bearing cam roller shown in simultaneous contact with two adjacently positioned cam followers on inboard ends of valve stems that are spaced radially about a cam follower guide ring surrounding the rotational path of the bearing cam roller.
Figure 10:
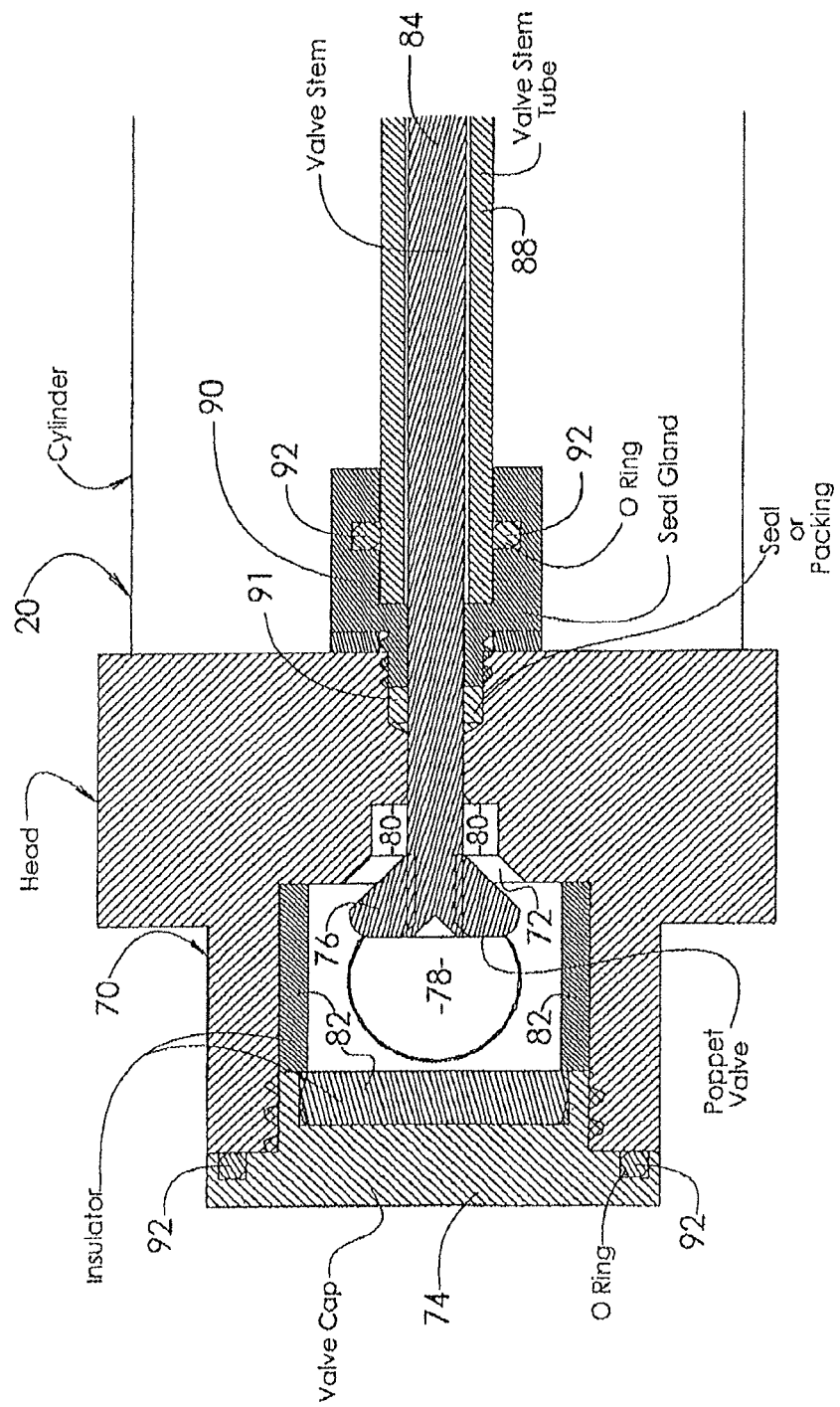
FIG. 10 is an isolated view, shown in cross-section, taken from the area indicated as 6 in FIG. 8, showing an intake valve at one of the cylinders in an open position to thereby allow injection of low pressure steam or gas into the top of the cylinder.
Figure 11:
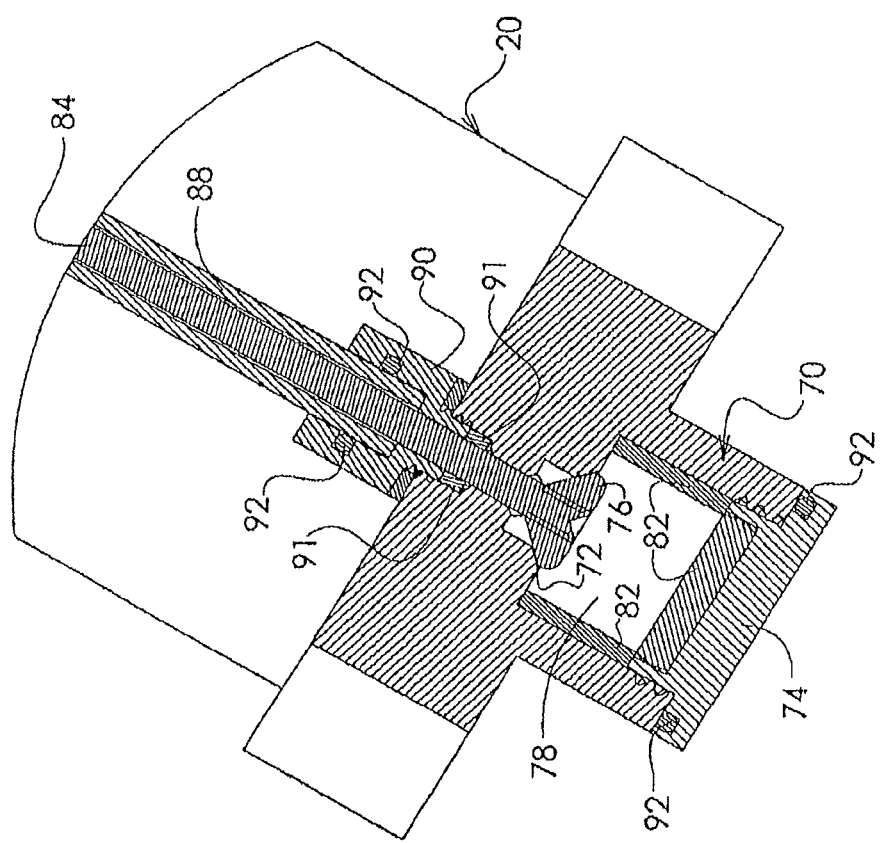
FIG. 11 is an isolated view, shown in cross-section, showing the intake valve of FIG. 10 in a closed position.
Figure 12:
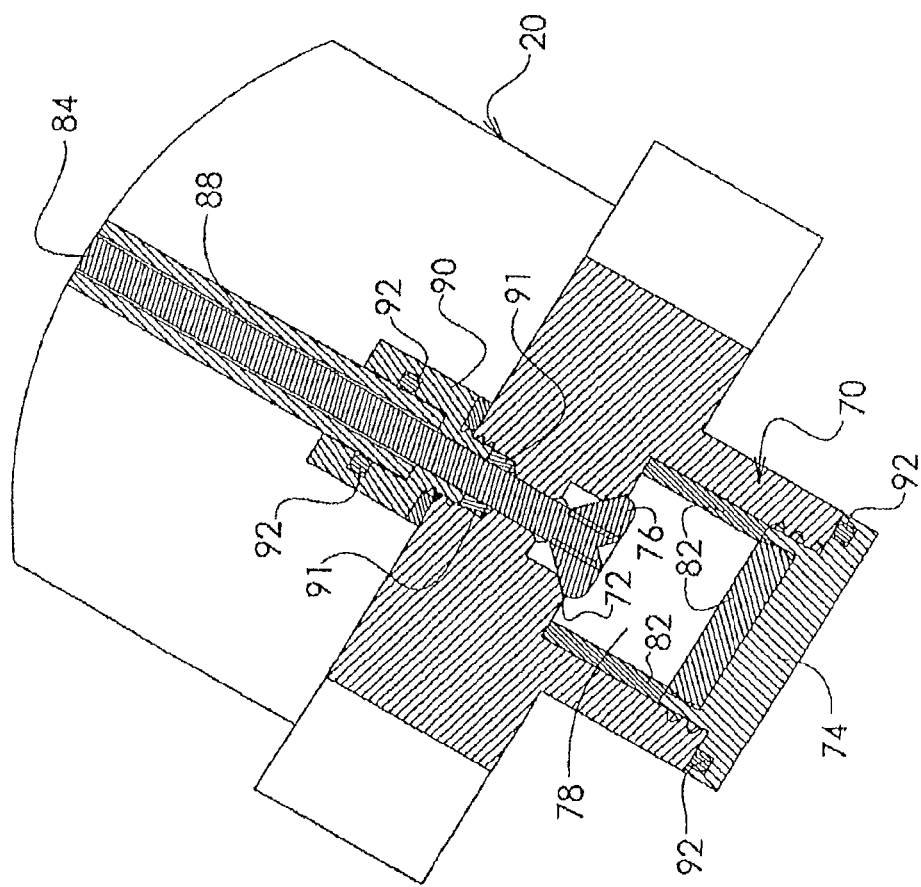
FIGS. 12A-12D illustrate reciprocating movement of a piston within a cylinder from a top dead center position through an exhaust stroke.
Figure 12:
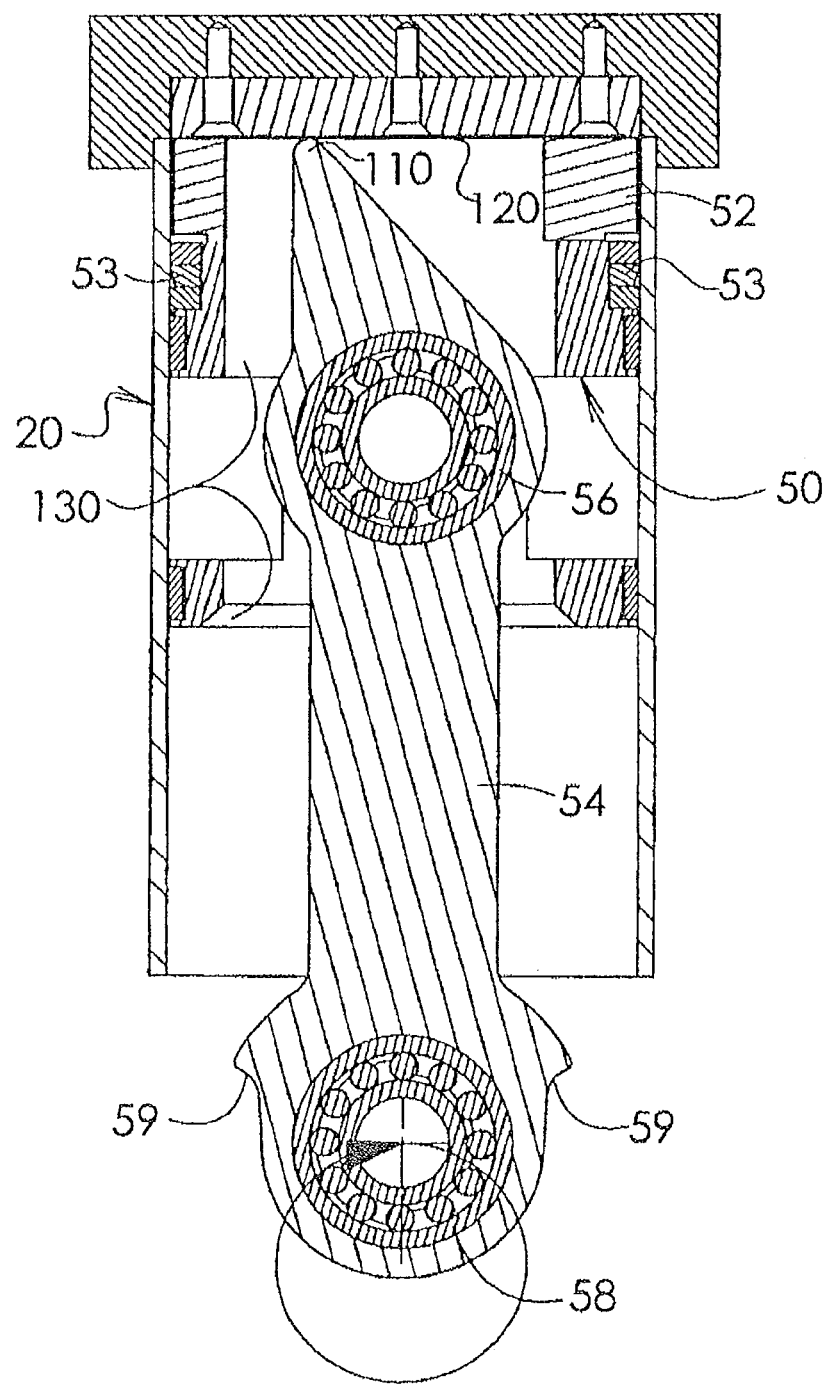
Figure 12:
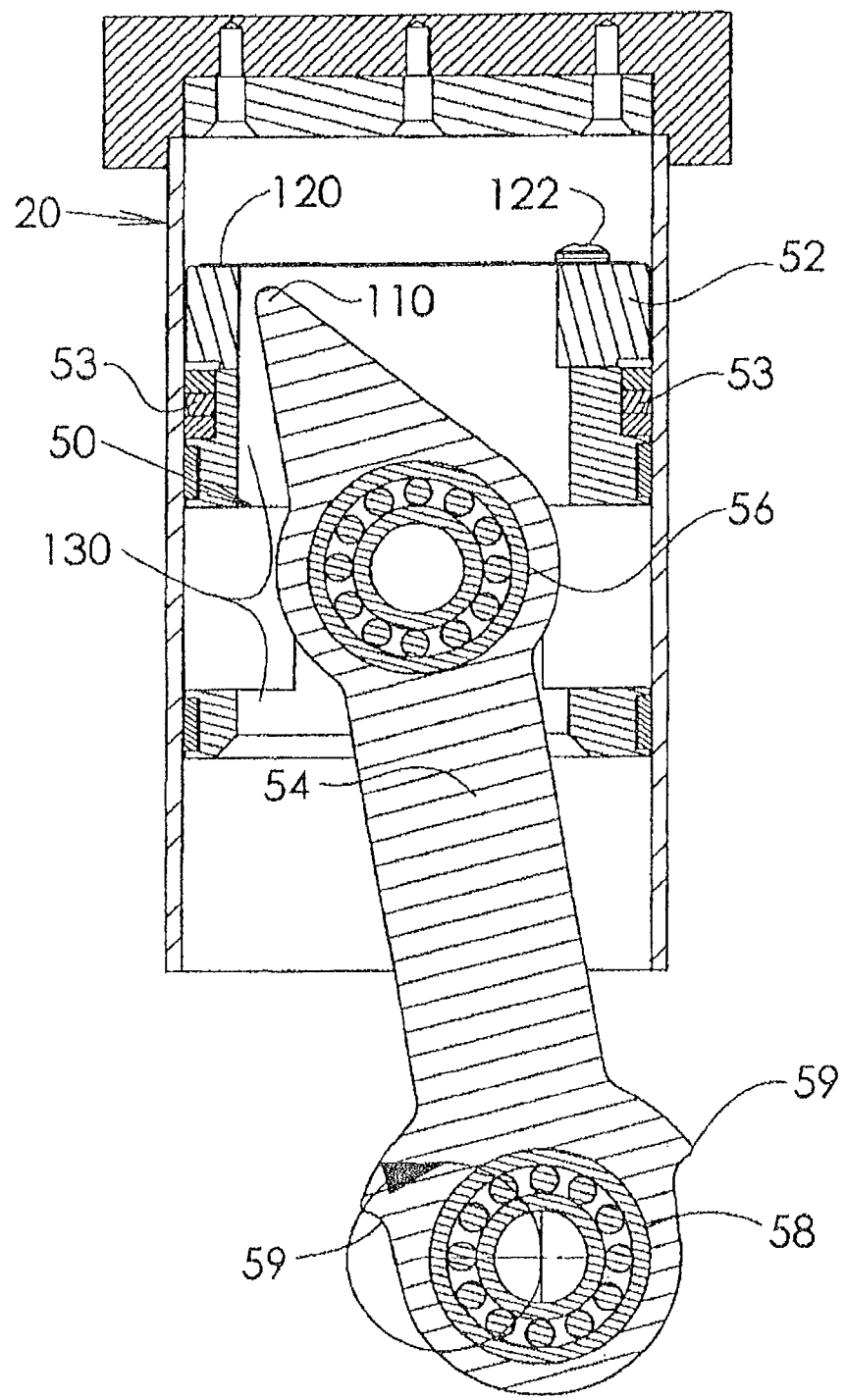
Figure 12:
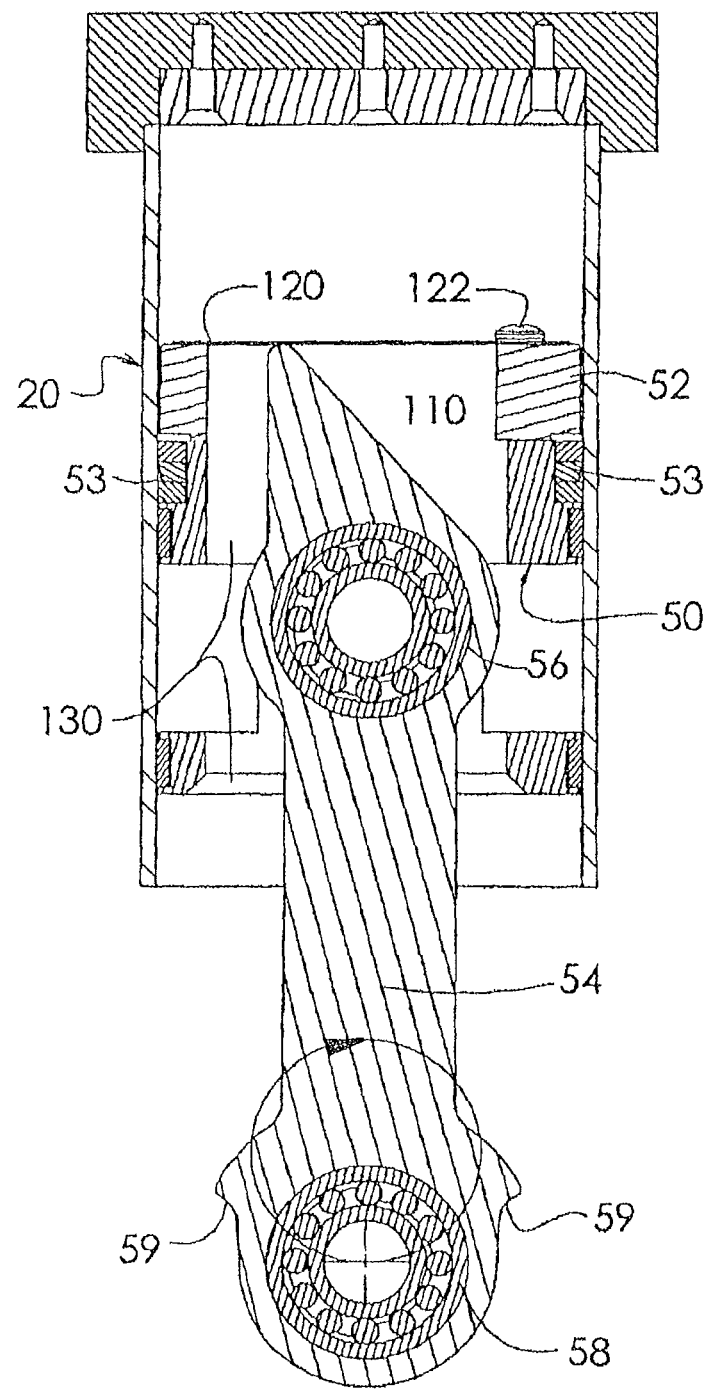
Figure 12:
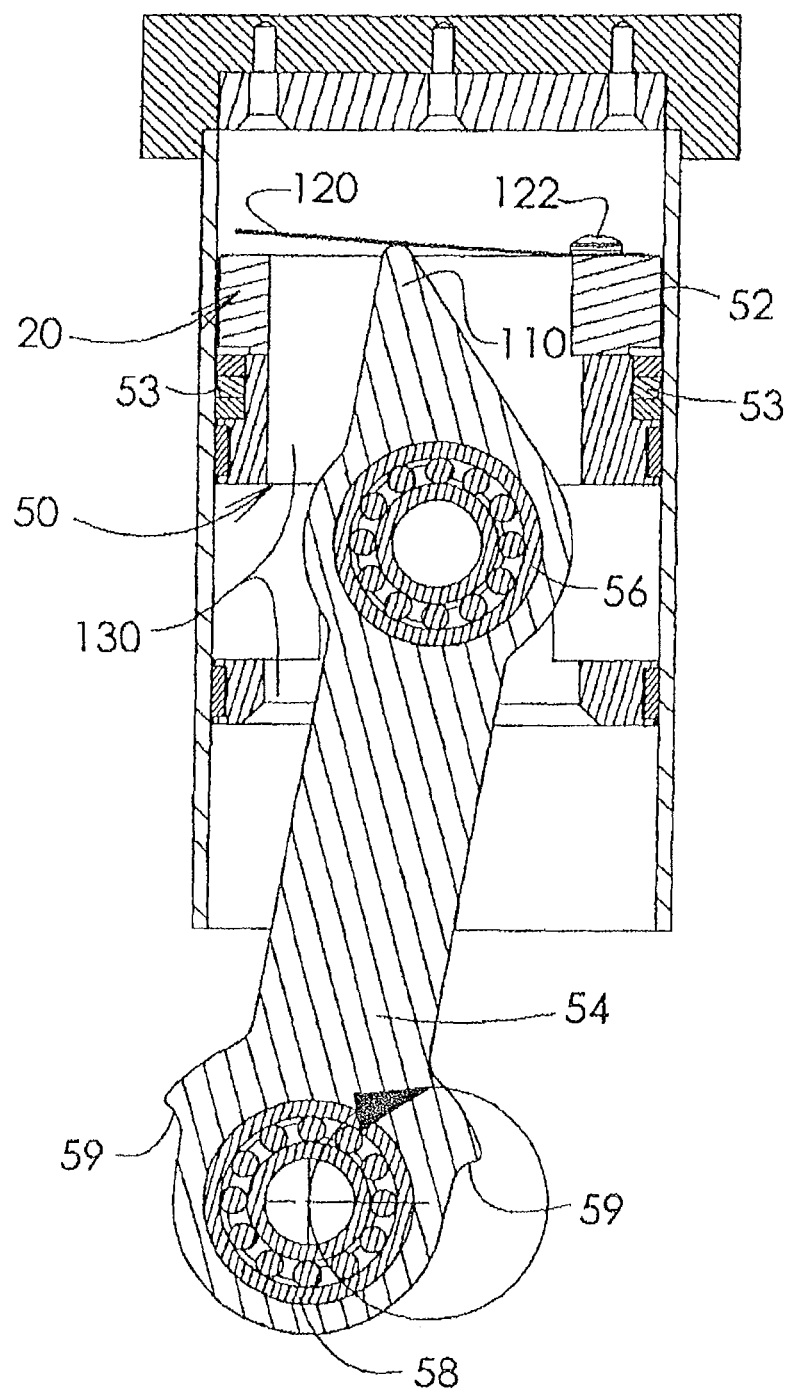

The steam injection valve assembly is shown in FIGS. 8-11. Referring to FIGS. 8, 10 and 11, a valve head 70 is located at the top of each cylinder. The valve head includes a valve seat 72 and a valve cap 74. A poppet valve 76 moves in relation to the valve seat 72, between an open position (see FIG. 10) and a closed position (see FIG. 11). Steam from the manifold 18 is directed into a valve chamber 78 within the valve head 70 and, when the poppet valve 76 is opened, the steam is injected through a port 80 and into the top of the cylinder 20. The valve chamber 78 is surrounded by an insulating material 82 to maintain the temperature of the steam within the chamber 78 when the valve 76 is closed. An elongate valve stem 84 extends from the poppet valve 76 inwardly towards a cam follower guide ring 86, as seen in FIGS. 8-9B. Referring to FIG. 8, it is seen that the valve stems 84 are arranged in the same radial configuration as the cylinders 20, with the valve stems 84 extending from the valve heads 70 at the top of the cylinders and inwardly to the cam follower guide ring 86. The valve stems 84 each extend through a valve stem tube 88 that is fitted to a seal gland 90 at the base of the valve head 70. A seal packing 91 and an O-ring 92 help to discourage escape of the steam from the valve head 70. An opposite inboard end of the valve stem tube 88 is fitted to an attachment tube 94 that extends into the cam follower guide ring 86. Cam followers 96 fitted to the end of each valve stem 84 are positioned to extend radially inward into an area 87 within the cam follower guide ring 86 at equally spaced intervals relative to the inner circumference of the guide ring. The cam followers 96 are urged inwardly towards the area within the guide ring by return springs 97 within the respective attachment tubes 94.

A ball bearing cam roller 100 is connected to the top of the spider bearing and/or a crank throw linked to the crankshaft. The cam roller 100 orbits about a circular path within the interior area 87 surrounded by the cam follower guide ring 86. A cam counter-balance weight 102 stabilizes movement of the cam roller 100 as it moves in the eccentric path within the cam follower guide ring 86. The cam roller 100 is specifically sized, structured and disposed for contacting the cam followers 96 on the ends of the valve stems 84. More particularly, as the cam roller 100 moves about the orbital path, it is in contact, at all times with at least one cam follower 96. Movement of the pistons 50 to drive the spider bearing 60 and the crankshaft 24 serves to also move the cam roller 100 in its circular path. As the cam roller 100 contacts each cam follower 96, the associated valve stem 84 is urged axially outward to open the respective poppet valve 76, thereby injecting steam into the associated cylinder 20. As previously noted, the cam roller 100 is always in contact with at least one cam follower 96, so that at any given moment, steam is being injected into at least one cylinder. As the cam roller 100 moves away from one cam follower 96, it simultaneously contacts the next cam follower 96, so that there is an overlap period of steam injection into two adjacent cylinders.

Referring to FIGS. 12A-12D, each piston assembly 50 within a respective cylinder 20 includes piston head 52 with a seal 53 that engages the inner wall surfaces of the cylinder. As the connecting rod 54 is angularly displaced during the exhaust stroke (see FIG. 12D), a valve lifter 110 on the top end of the connecting rod 54, defined by a generally triangular formation with an apex, hits an exhaust reed valve 120 on the top of the piston head 52. The valve lifter 110 urges the exhaust reed valve 120 from a relaxed position to a raised position, against the force of the spring action of the reed valve flap which is secured at one end by fastener 122 to the piston head 52. With the reed valve flap 120 in the open position, as seen in FIG. 11D, the low pressure steam in the upper portion of the cylinder is released through ports 130 formed through the piston head 52, allowing the steam to exhaust into a condenser chamber 132 of the engine 10 as the piston 50 returns to the top dead center position. In such an engine, the cylinders 52 of the engine are arranged in a radial configuration with the cylinder heads 51 and valves 53 extending into the cyclone furnace. A cam 70 moves pushrods 74 to control opening of steam injection valves 53. At higher engine speeds, the steam injection valves 53 are fully opened to inject steam into the cylinders 52, causing piston heads 54 to be pushed radially inward. Movement of the piston heads 54 causes connecting rods 56 to move radially inward to rotate crank disk 61 and crankshaft 60. Each connecting rod 56 connects to the crank disk 61. More specifically, the inner circular surface of the connecting rod link is fitted with a bearing ring 59 for engagement about hub 63 on the crank disk 61. In a preferred embodiment, the crank disk 61 is formed of a bearing material which surrounds the outer surface of the connecting rod link, thereby providing a double-backed bearing to carry the piston load. The connecting rods 56 are driven by this crank disk 61. These rods are mounted at equal intervals around the periphery of this circular bearing. The lower portions of the double-backed bearings joining the piston connecting rods to the crank disk 61 are designed to limit the angular deflection of the connecting rods 56 so that clearance is maintained between all six connecting rods during one full rotation of the crankshaft 60. The center of the crank disk 61 is yoked to a single crankshaft journal 62 that is offset from the central axis of the crankshaft 60. While the bottom ends of the connecting rods 56 rotate in a circle about the crank disk 61, the offset of the crank journal 62 on which the crank disk 61 rides creates a geometry that makes the resultant rotation of these rods travel about an elliptical path. This unique geometry confers two advantages to the operation of the engine. First, during the power stroke of each piston, its connecting rod is in vertical alignment with the motion of the driving piston thereby transferring the full force of the stroke. Second, the offset between the connecting rods 56 and the crank disk 61, the offset between the crank disk and the crank journal 62, and the offset of the crank journal 62 to the crankshaft 60 itself, combine to create a lever arm that amplifies the force of each individual power stroke without increasing the distance the piston travels. Accordingly, the mechanical efficiency is enhanced. This arrangement also provides increased time for steam admission and exhaust.

Steam under super-critical pressure is admitted to the cylinders 52 of the engine by a mechanically linked throttle mechanism acting on the steam injection needle valve 53. To withstand the 600-1,000° F. operating temperatures, the needle valves 53 are water cooled at the bottom of their stems by water piped from and returned to the condenser 30 by a water lubrication pump 96. Along the middle of the valve stems, a series of labyrinth seals, or grooves in the valve stem, in conjunction with packing rings and lower lip seals, create a seal between each valve stem and a bushing within which the valve moves. This seals and separates the coolant flowing past the top of the valve stem and the approximate 225 psi pressure that is encountered at the head and seat of each valve. Removal of this valve 53, as well as adjustment for its seating clearance, can be made by threads machined in the upper body of the valve assembly. The needle valve 53 admitting the super-heated steam is positively closed by a spring 82 within each valve rocker arm 80 that is mounted to the periphery of the engine casing. Each spring 82 exerts enough pressure to keep the valve 53 closed during static conditions.

The motion to open each valve is initiated by a crankshaft-mounted cam ring 84. A lobe 85 on the cam ring forces a throttle follower 76 to 'bump' a single pushrod 74 per cylinder 52. Each pushrod 74 extends from near the center of the radially configured six cylinder engine outward to the needle valve rocker 80. The force of the throttle follower 76 on the pushrod 74 overcomes the spring closure pressure and opens the valve 53. Contact between the follower, the rocker arm 80, and the pushrod 74 is determined by a threaded adjustment socket mounted on each needle valve rocker arm 80.

Throttle control on the engine is achieved by varying the distance each pushrod 74 is extended, with further extension opening the needle valve a greater amount to admit more super-heated fluid. All six rods 74 pass through a throttle control ring 78 that rotates in an arc, displacing where the inner end of each push rod 74 rests on the arm of each cam follower (see FIG. 8). Unless the follower 76 is raised by the cam lobe 85, all positions along the follower where the push rod 74 rests are equally 'closed'. As the arc of the throttle ring 78 is shifted, the resting point of the push rod 74 shifts the lever arm further out and away from the fulcrum of the follower. When the follower 76 is bumped by the cam lobe 85, the arc distance that the arm traverses is magnified, thereby driving the push rod 74 further, and thus opening the needle valve 53 further. A single lever attached to the throttle ring and extending to the outside of the engine casing is used to shift the arc of the throttle ring, and thus becomes the engine throttle.

As the throttle ring 78 is advanced, more steam is admitted to the cylinder, allowing an increase in RPM. When the RPM increases, the pump 90 supplies hydraulic pressure to lift the cam ring 84 to high speed forward. The cam ring 84 moves in two phases, jacking up the cam to decrease the cam lobe duration and advance the cam timing. This occurs gradually as the RPM's are increased to a pre-determined position. The shift lever 102 is spring loaded on the shifting rod 104 to allow the sleeve 86 to lift the cam ring 84.

To reverse the engine, it must be stopped by closing the throttle. Reversing the engine is not accomplished by selecting transmission gears, but is done by altering the timing. More specifically, reversing the engine is accomplished by pushing the shift rod 104 to lift the cam sleeve 86 up the crankshaft 60 as the sleeve cam pin 88 travels in a spiraling groove in the cam ring causing the crank to advance the cam past top dead center. The engine will now run in reverse as the piston pushes the crank disk at an angle relative to the crankshaft in the direction of reverse rotation. This shifting movement moves only the timing and not the duration of the cam lobe to valve opening. This will give full torque and self-starting in reverse. High speed is not necessary in reverse.

Exhaust steam is directed through a primary coil which also serves to preheat the water in the generator (22 of FIG. 3, 22A of FIG. 3A). The exhaust steam is then directed through the condenser 30, in a centrifugal system of compressive condensation. As described above, the cooling air circulates through the flat plates, is heated in an exhaust heat exchanger 42 and is directed into the burner 40. This reheat cycle of air greatly adds to the efficiency and compactness of the engine.

The water delivery requirements of the engine are served by a poly-phase pump 90 that comprises three pressure pump systems. One is a high pressure pump system 92 mounted adjacently within the same housing. A medium pressure pump system 94 supplies the water pressure to activate the clearance volume valve and the water pressure to operate the cam timing mechanism. A lower pressure pump system 96 provides lubrication and cooling to the engine. The high pressure unit pumps water from the condenser sump 34 through six individual lines 21, past the coils of the combustion chamber 22 to each of the six needle valves 53 that provide the super-heated fluid to the power head of the engine. This high pressure section of the poly-phase pump 90 contains radially arranged pistons that closely resemble the configuration of the larger power head of the engine. The water delivery line coming off each of the water pump pistons is connected by a manifold 98 that connects to a regulator shared by all six delivery lines that acts to equalize and regulate the water delivery pressure to the six pistons of the power head. All regulate the water delivery pressure to the six pistons of the power head. All pumping sub units within the poly-phase pump are driven by a central shaft. This pump drive shaft is connected to the main engine crankshaft 60 by a mechanical coupler. When the engine is stopped, an auxiliary electric motor pumps the water, maintaining the water pressure necessary to restarting the engine.

Thus, the overall all-in-one device includes, as necessary components, a working fluid pump, a used fuel source heater, a dual container siphon reservoir, at least one combustion air fan, a combustion chamber with coiled metal (such as, as one example, stainless steel) lines for water/steam movement, one fuel injector with an igniter, an exhaust system, a shaft coupling, an electrical generator, a cooling fan and radiator assembly, a condensing reservoir, an air compressor (optional), and a specific steam engine with radial cylindrical pistons attached to a cam shaft. Such components are provided, with other switches, proper tubing and wiring, and other components, such as measurement gauges, mounting plates, and a metal frame, to provide a compact and efficient device to generate electricity through a portable configuration and through the utilization of waste oil, diesel, gasoline, natural gas, methane or syngas fuel sources.

The specific steam engine itself includes, as necessary components, a condenser, a steam generator and a main engine section having valves, cylinders, pistons, pushrods, a main bearing, cams and a camshaft. Ambient air is introduced into the combustion chamber by intake blower(s). In the combustion chamber, the air is mixed with fuel from a fuel atomizer and ignited by an electric igniter. The burner burns the atomized fuel in a combustion chamber sized properly to allow for complete incineration of the fuel. The hot gases travel over the super heater coils (larger tubes nearest the flame) and then redirected over the remaining coiled tubes before it is exhausted out the flue. The steam temperature in the tube(s) will reach temperature of between 450 to 600 degrees F. The cylinders of the engine are arranged in a radial configuration. In the combustion chamber, the steam is super heated and maintained at a pressure up to approximately 200 to 300 psi.

The exhaust steam is directed through a condenser located directly under the pistons. From there the fluid/steam travels through a radiator on its way to the condensing tub at the bottom of the total device. As noted above, the heat from the condenser may be captured and utilized to heat a space adjacent to the device or even transferred through ducts to a selected area. With the continued recycling of the working fluid, the condenser will continuously exhibit an exothermic state that permits such a beneficial function.

The speed and torque of the engine are controlled by a rocker and cam design which serves to open and close a needle type valve in the engine head. When the valve is opened, high pressure, high temperature steam is injected into the cylinder and allowed to expand on the top of the piston high pressure. In addition, it provides such a system wherein such at least one electrical network further comprises at least one connection to at least one larger electrical grid. The overall device may also be connected to a single or multiple electrical outlets (or even directly into apparatuses that utilize electricity generated in such a fashion), if desired.

A complete disclosure of the details and essence of this invention has been made, and the best modes of practicing it as now contemplated have been presented. It will be apparent to all skilled in the art that modifications, substitutions and additions may be made in the elements of the invention without departing from its concepts, the scope of which is defined and limited only by the ensuing claims.

What I claim is:

1. An all-in-one electrical generator comprising a fuel system, an engine system, and an electrical system as three separate major systems, wherein each of said major systems comprises its own components, wherein:
    a) said fuel system comprises, as its own components, i) a fuel pump; ii) a combustion chamber for the combustion and incineration of a volatile liquid fuel to generate heat, iii) a volatile liquid fuel injector with an ignition device to spark within said combustion chamber, iv) at least one combustion air fan present within the combustion chamber, v) at least one exhaust port, vi) an air compressor; vii) an atomizer to atomize said volatile liquid fuel within said combustion chamber, viii) a fuel heater, and ix) a fuel reservoir;
    b) said engine system comprises, as its own components, i) a heat exchanger connected directly to said fuel system, said heat exchanger including at least one coiled tube within which a working fluid is present, wherein said at least one coiled tube is disposed above or around said combustion chamber of said fuel system, and wherein said working fluid evaporates to form said steam therein upon exposure to said heat generated upon the combustion or incineration of said liquid fuel therein, ii) at least one steam line attached to and leading from said at least one coiled tube to an engine and disposed within a plane in relation to said engine, iii) said engine comprising a main bearing, a camshaft, and a plurality of valves, cylinders, pistons, pushrods, and cams, wherein said plurality of radially configured pistons are housed within said cylinders and attached to said main bearing through said pushrods, wherein said pistons are present in substantially the same plane through which said steam from said heat exchanger passes from said at least one steam line to create piston movement thereby, iv) a rotating crankshaft or drive shaft, v) a condenser through which said steam passes subsequent to passing through said pistons, said condenser comprising a radiator including a radiator fan to condense said steam into a working fluid condensate, vi) a sump for collection of said condensate, vii) one pump and a line to deliver at least a portion of said condensate to said heat exchanger for recycling therein, and viii) another pump and another line to deliver at least a portion of said condensate to said plurality of radially configured pistons for lubrication thereof; and
    c) said electrical system comprises, as its own component, a generator/electric motor which creates electrical charges in relation to the movement of said crankshaft or drive shaft;
    wherein said all-in-one electrical generator exhibits a total foot print of at most 4.6 square feet of area and includes a frame to which said three separate systems are attached and configured in a stacked or side by side relation.

2. The electrical generator of claim 1 wherein said fluid reservoir is a siphon reservoir.

3. A method of generating electrical charge through the utilization of the all-in-one electrical generator of claim 1, said method comprising the steps of:
    a) introducing said volatile liquid fuel within said fuel system,
    b) heating and incinerating said volatile liquid fuel within said combustion chamber, thereby generating sufficient heat to evaporate said working fluid present within said at least one coiled tube to generate steam therein,
    c) pumping said evaporated working fluid from said at least one coiled tube into said at least one steam line,
    d) transferring said steam from said at least one steam line into said plurality of radially configured pistons of said engine within said engine system, thereby causing said plurality of pistons to cycle, thereby creating mechanical energy,
    e) transferring said created mechanical energy via said crankshaft or drive shaft to said electrical system, and
    f) thereby converting said mechanical energy to electrical charges within said electrical system;
    wherein said working fluid is condensed into a liquid state after passing through said plurality of radially configured pistons, utilized to lubricate said radially configured pistons and recycled within said heat exchanger.

4. The method of claim 3 wherein said working fluid is selected from the group consisting of tap water, deionized water, toluene, and a low carbon alcohol.

5. The method of claim 4 wherein said working fluid is said deionized water.

6. The method of claim 3 wherein said volatile liquid fuel is selected from the group consisting of waste oil, diesel, gasoline, and any combination thereof.

7. The method of claim 1 wherein said volatile liquid fuel is selected from the group consisting of waste oil, diesel, gasoline, and any combination thereof.

8. An all-in-one electrical generator including a fuel system, an engine system, and an electrical system as three separate major systems, wherein each of said major systems comprises its own components, wherein:
    a) said fuel system comprises, as its own components, i) a volatile gas fuel regulator; ii) a combustion chamber for the combustion and incineration of a volatile gaseous fuel to generate heat, iii) an ignition device to spark within said combustion chamber, iv) at least one combustion air fan present within the combustion chamber, v) at least one exhaust port, and vi) a fuel reservoir;
    b) said engine system comprises, as its own components, i) a heat exchanger connected directly to said fuel system, said heat exchanger including at least one coiled tube within which a working fluid is present, wherein said at least one coiled tube is disposed above or around said combustion chamber of said fuel system, and wherein said working fluid evaporates to form said steam therein upon exposure to said heat generated upon the combustion or incineration of said volatile gaseous fuel therein, ii) at least one steam line attached to and leading from said at least one coiled tube to an engine and disposed within a plane in relation to said engine, iii) said engine comprising a main bearing, a camshaft, and a plurality of valves, cylinders, pistons, pushrods, and cams, wherein said plurality of radially configured pistons are housed within said cylinders and attached to said main bearing through said pushrods, wherein said pistons are present in substantially the same plane through which said steam from said heat exchanger passes from said at least one steam line to create piston movement thereby, iv) a rotating crankshaft or drive shaft, v) a condenser through which said steam passes subsequent to passing through said pistons, said condenser comprising a radiator including a radiator fan to condense said steam into a working fluid condensate, vi) a sump for collection of said condensate, vii) one pump and a line to deliver at least a portion of said condensate to said heat exchanger for recycling therein, and viii) another pump and another line to deliver at least a portion of said condensate to said plurality of radially configured pistons for lubrication thereof; and c) said electrical system comprises, as its own component, a generator/electric motor which creates electrical charges in relation to the movement of said crankshaft or drive shaft;

wherein said all-in-one electrical generator exhibits a total foot print of at most 4.6 square feet of area and includes a frame to which said three separate major systems are attached and configured in a stacked or side by side relation.

9. A method of generating electrical charge through the utilization of the all-in-one electrical generator of claim 8, said method comprising the steps of:
  a) introducing said volatile gaseous fuel within said fuel system,
  b) heating and incinerating said volatile gaseous fuel within said combustion chamber, thereby generating sufficient heat to evaporate said working fluid present within said at least one coiled tube to generate steam therein,
  c) pumping said evaporated working fluid from said at least one coiled tube into said at least one steam line,
  d) transferring said steam from said at least one steam line into said plurality of radially configured pistons of said engine within said engine system, thereby causing said plurality of pistons to cycle, thereby creating mechanical energy,
  e) transferring said created mechanical energy via said crankshaft or drive shaft to said electrical system, and
  f) thereby converting said mechanical energy to electrical charges within said electrical system;
  wherein said working fluid is condensed into a liquid state after passing through said plurality of radially configured pistons and utilized to lubricate said radially configured pistons and recycled within said heat exchanger.

10. The method of claim 9 wherein said working fluid is selected from the group consisting of tap water, deionized water, toluene, and a low carbon alcohol.

11. The method of claim 10 wherein said working fluid is said deionized water.

12. The method of claim 9 wherein said volatile gaseous fuel is selected from the group consisting of natural gas, syngas, and any combination thereof.

13. The method of claim 8 wherein said volatile gaseous fuel is selected from the group consisting of natural gas, syngas, and any combination thereof.

* * * * *